US011138920B2

United States Patent
Yee

(10) Patent No.: US 11,138,920 B2
(45) Date of Patent: Oct. 5, 2021

(54) PULSE WIDTH MODULATION FOR DRIVING PIXEL USING COMPARATOR

(71) Applicant: Facebook Technologies, LLC, Menlo Park, CA (US)

(72) Inventor: Michael Yee, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/779,168

(22) Filed: Jan. 31, 2020

(65) Prior Publication Data

US 2020/0251043 A1 Aug. 6, 2020

Related U.S. Application Data

(60) Provisional application No. 62/800,979, filed on Feb. 4, 2019.

(51) Int. Cl.
*G09G 3/22* (2006.01)
*G02B 27/01* (2006.01)
*G09G 3/32* (2016.01)

(52) U.S. Cl.
CPC .............. *G09G 3/22* (2013.01); *G02B 27/017* (2013.01); *G09G 3/32* (2013.01); *G02B 2027/0178* (2013.01); *G09G 2310/0264* (2013.01); *G09G 2310/0267* (2013.01); *G09G 2310/06* (2013.01); *G09G 2310/08* (2013.01);
(Continued)

(58) Field of Classification Search
CPC .... G09G 3/22; G09G 3/32; G09G 2310/0267; G09G 2310/08; G09G 2320/0233; G09G 2320/064; G09G 2320/0693; G09G 2310/0264; G09G 2310/06; G09G 3/2092; G09G 2370/08; G09G 2300/0814; G09G 2310/0248; G02B 27/017;
(Continued)

(56) References Cited

U.S. PATENT DOCUMENTS

2009/0102854 A1 4/2009 Lai et al.
2017/0330509 A1* 11/2017 Cok ..................... G09G 3/2014

OTHER PUBLICATIONS

Lidiya Mariam Koshy et al: "Low Leakage and High Performance tag Comparator Implemented in 180 nm CMOS Technology" , Procedi a Computer Science, vol. 46, Jan. 1, 2015 (Jan. 1, 2015), pp. 1261-1267, XP055685165, Amsterdam, NL ISSN: 1877-0509, DOI: 10.1016/j.procs.2015.01.046 the whole document (Year: 2015).*
(Continued)

*Primary Examiner* — Mark W Regn
(74) *Attorney, Agent, or Firm* — Fenwick & West LLP

(57) ABSTRACT

A display device provides pulse width modulation (PWM) control of pixels using comparator circuits within each pixel. The display device includes a display panel and a row driver connected to the display panel. The row driver includes a counter configured to generate count bit values for subframes of a pulse width modulation (PWM) frame. The display panel includes pixels, each pixel including a comparator circuit and a light emitting diode. The comparator circuit includes a dynamic comparison node. The comparator circuit is configured to generate comparison results at the dynamic comparison node by comparing the count bit values of the subframes and data bit values of a control word defining a brightness level of the pixel for the PWM frame. The LED is configured to turn on or off responsive to the comparison results at the dynamic comparison node.

19 Claims, 17 Drawing Sheets

(52) U.S. Cl.
CPC ............ *G09G 2320/0233* (2013.01); *G09G 2320/064* (2013.01); *G09G 2320/0693* (2013.01)

(58) Field of Classification Search
CPC ...... G02B 2027/0178; G02B 2027/014; G02B 2027/0132; G02B 27/0172
See application file for complete search history.

(56) References Cited

OTHER PUBLICATIONS

Anonymous: JK Flip-flops'1,Feb. 21, 2015 (Feb. 21, 2015), XP055685235, Learn About Electronics Retrieved from the Internet: URL:https://web.archive.org/web/2015022108 2127/https://learnabout-electronics.org/Di gital/dig54.php [retrieved on Apr. 14, 2020] the whole document (Year: 2015).*

Koshy, L. M. et al. "Low Leakage and High Performance Tag Comparator Implemented in 180nm CMOS Technology." Procedia Computer Science, vol. 46, Jan. 1, 2015, pp. 1261-1267.

Learnabout-Electronics. "Module 5: 5.4 JK Flip-Flops." Learnabout-Electronics.org, Feb. 21, 2015, 4 pages, [Online] [Retrieved Jun. 3, 2020], Retrieved from the internet <URL: https://web.archive.org/web/20150221082127/https://learnabout-electronics.org/Digital/dig54.php>.

PCT International Search Report and Written Opinion, PCT Application No. PCT/US2020/016392, dated Apr. 24, 2020, 18 pages.

United States Office Action, U.S. Appl. No. 16/779,206, filed May 7, 2021, 19 pages.

\* cited by examiner

FIG. 8B

| | Count | 0 | 1 | 2 | 3 | 4 | 5 | 6 | 7 |
|---|---|---|---|---|---|---|---|---|---|
| | Binary | 000 | 001 | 010 | 011 | 100 | 101 | 110 | 111 |
| | Inverse | 111 | 110 | 101 | 100 | 011 | 010 | 001 | 000 |
| Intensity Level | | | | | | | | | |
| Decimal | Binary | | | | | | | | |
| 0 | 000 | 0 | 0 | 0 | 0 | 0 | 0 | 0 | 0 |
| 1 | 001 | 1 | 0 | 0 | 0 | 0 | 0 | 0 | 0 |
| 2 | 010 | 1 | 0 | 0 | 0 | 1 | 0 | 0 | 0 |
| 3 | 011 | 1 | 0 | 1 | 0 | 1 | 0 | 0 | 0 |
| 4 | 100 | 1 | 0 | 1 | 0 | 1 | 0 | 1 | 0 |
| 5 | 101 | 1 | 1 | 1 | 0 | 1 | 0 | 1 | 0 |
| 6 | 110 | 1 | 1 | 1 | 0 | 1 | 1 | 1 | 0 |
| 7 | 111 | 1 | 1 | 1 | 1 | 1 | 1 | 1 | 0 |

Provide signals to a first pixel row of a display device to drive the first pixel row using a first time interval for a subframe of a pulse width modulation (PWM) frame of the first pixel row
1605

Provide signals to a second pixel row of the display device to drive the second pixel row using a second time interval for a subframe of a PWM frame of the second pixel row, the first time interval being different from the second time interval
1610

FIG. 16

PULSE WIDTH MODULATION FOR DRIVING PIXEL USING COMPARATOR

CROSS REFERENCE TO RELATED APPLICATION

This application claims the benefit of U.S. Provisional Application No. 62/800,979, filed Feb. 4, 2019, which is incorporated by reference in its entirety.

BACKGROUND

Pulse width modulation (PWM) provides for control of the intensity level of pixels of an electronic display based on the bit values of control words. In each PWM frame, a light emitting diode (LED) of a pixel is turned on for a variable number of subframes based on the bit values of a control word for the PWM frame to set the intensity level of light emission for the PWM frame. In a 3-bit PWM control scheme, for example, the bit values 000 for a control word correspond with a lowest intensity level while the bit values 111 correspond with a highest intensity level. It is desirable to achieve PWM in electronic displays with reduced hardware requirements, as well reduced switching on and off for the LEDs when using PWM.

SUMMARY

A display device provides pulse width modulation (PWM) control of pixels using comparator circuits within each pixel. The display device may include a display panel and a row driver connected to the display panel. The row driver may include a counter configured to generate count bit values for subframes of a pulse width modulation (PWM) frame. The display panel may include pixels, each pixel including a comparator circuit and a light emitting diode. The comparator circuit may include a dynamic comparison node. The comparator circuit may be configured to generate comparison results at the dynamic comparison node by comparing the count bit values of the subframes and data bit values of a control word for the PWM frame. The LED may be configured to turn on or off responsive to the comparison results at the dynamic comparison node.

Some embodiments may include a method for control of pixels of a display device using comparator circuits within each pixel. The method may include generating, by a counter of a row driver of a display device, count bit values for subframes of a pulse width modulation (PWM) frame. The method may further include generating, by a comparator circuit of a pixel of a display panel of the display device, comparison results at a dynamic comparison node of the comparator circuit by comparing the count bit values of the subframes and data bit values of a control word for the PWM frame. The method may further include turning on or off a light emitting diode (LED) of the pixel responsive to the comparison results at the dynamic comparison node.

BRIEF DESCRIPTION OF THE DRAWINGS

FIG. 8B is a diagram illustrating variable PWM timing across pixel rows of the display device for brightness control, in accordance with some embodiments.

FIG. 15 shows a table of comparison results at a dynamic comparison node of the pixel, in accordance with some embodiments.

FIG. 16 is a flowchart illustrating a process for row based brightness uniformity compensation in a display device, in accordance with some embodiments.

The figures depict embodiments of the present disclosure for purposes of illustration only.

DETAILED DESCRIPTION

Embodiments relate to PWM control of pixels using comparator circuits within each pixel. The ordered comparison between count bits and data bits within each pixel to control the switching of an LED in the pixel provides for a simplified circuit for PWM control. The comparator circuit within each pixel uses a reduced comparison function where the data significance matches the count significance. Word line and count bit pairs can be rearranged allowing failing data locations in a memory of the pixel to be pushed to lower significance, thereby minimizing the visual impact. The PWM control turns the LED on only once for each PWM frame (e.g., for different durations depending on the control word of the PWM frame)), thus decreasing the amount of switching on and off for the LED.

Figure 1:
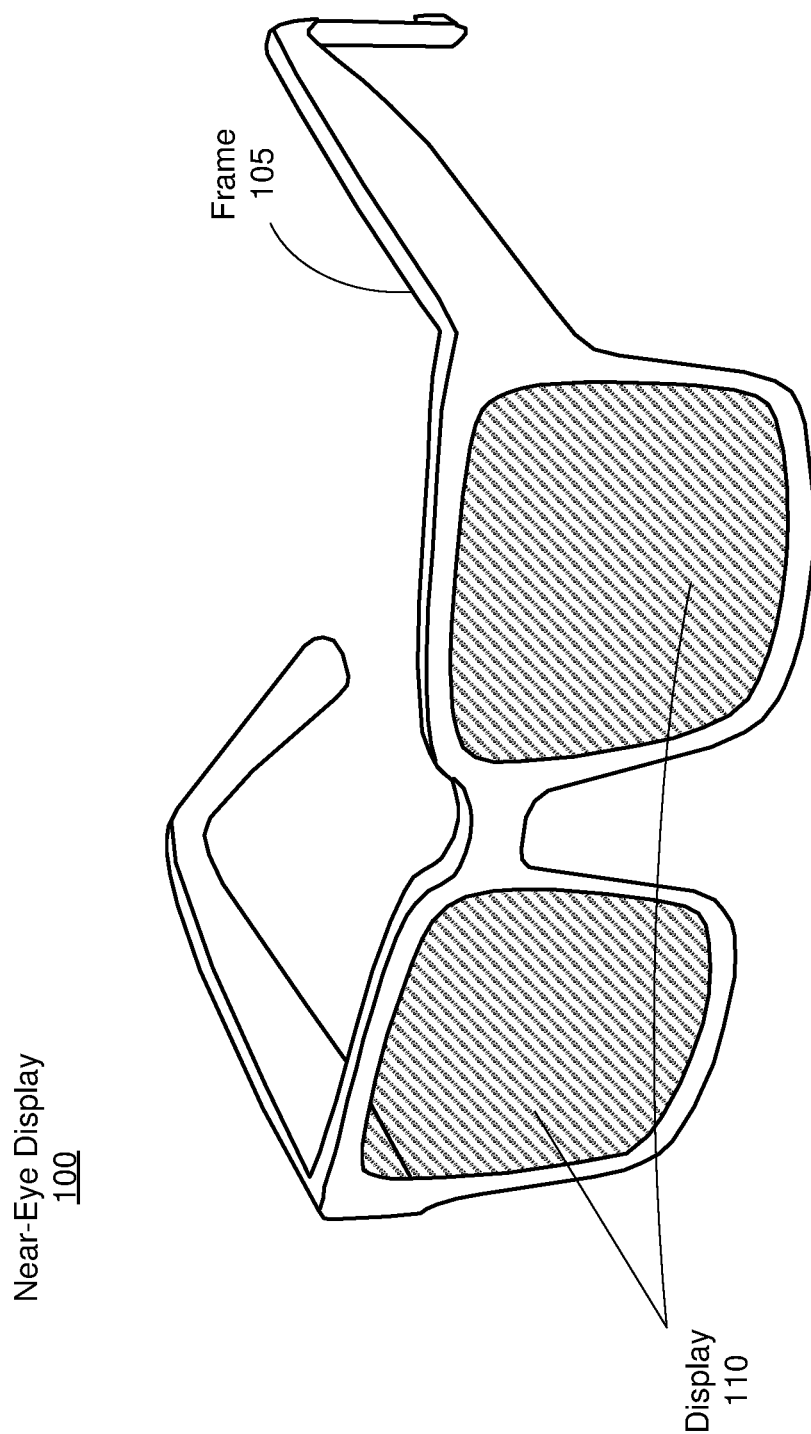
FIG. 1 is a perspective view of a near-eye-display (NED), in accordance with some embodiments.

FIG. 1 is a diagram of a near-eye display (NED) 100, in accordance with some embodiments. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 may operate as a VR NED. However, in some embodiments, the NED 100 may be modified to also operate as an augmented reality (AR) NED, a mixed reality (MR) NED, or some combination thereof. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 includes one or more optical elements which together display media to users. The display 110 is configured for users to see the content presented by the NED 100. As discussed below in conjunction with FIG. 2, the display 110 includes at least a source assembly to generate an image light to present media to an eye of the user. The source assembly includes, e.g., a light source, an optics system, or some combination thereof.

FIG. 1 is only an example of a VR system. However, in alternate embodiments, FIG. 1 may also be referred to as a Head-Mounted-Display (HMD).

Figure 2:
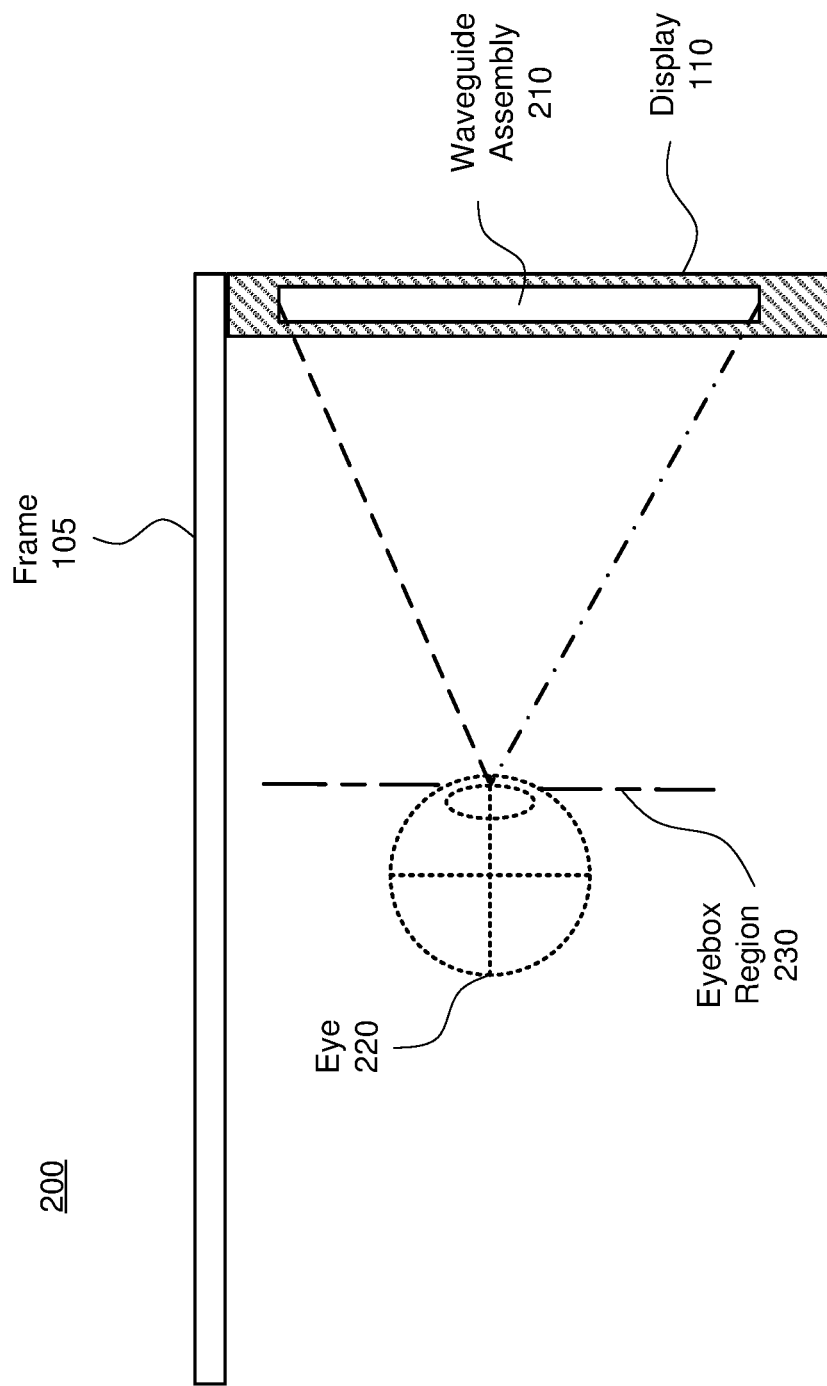
FIG. 2 is a cross-section of an eyewear of the NED illustrated in FIG. 1, in accordance with some embodiments.

FIG. 2 is a cross section 200 of the NED 100 illustrated in FIG. 1, in accordance with some embodiments. The cross section 200 illustrates at least one waveguide assembly 210. An exit pupil is a location where the eye 220 is positioned in an eyebox region 230 when the user wears the NED 100. In some embodiments, the frame 105 may represent a frame of eye-wear glasses. For purposes of illustration, FIG. 2 shows the cross section 200 associated with a single eye 220 and a single waveguide assembly 210, but in alternative embodiments not shown, another waveguide assembly which is separate from the waveguide assembly 210 shown in FIG. 2, provides image light to another eye 220 of the user.

The waveguide assembly 210, as illustrated below in FIG. 2, directs the image light to the eye 220 through the exit pupil. The waveguide assembly 210 may be composed of one or more materials (e.g., plastic, glass, etc.) with one or more refractive indices that effectively minimize the weight and widen a field of view (hereinafter abbreviated as 'FOV') of the NED 100. In alternate configurations, the NED 100 includes one or more optical elements between the waveguide assembly 210 and the eye 220. The optical elements may act (e.g., correct aberrations in image light emitted from the waveguide assembly 210) to magnify image light emitted from the waveguide assembly 210, some other optical adjustment of image light emitted from the waveguide assembly 210, or some combination thereof. The example for optical elements may include an aperture, a Fresnel lens, a convex lens, a concave lens, a filter, or any other suitable optical element that affects image light.

Figure 3:
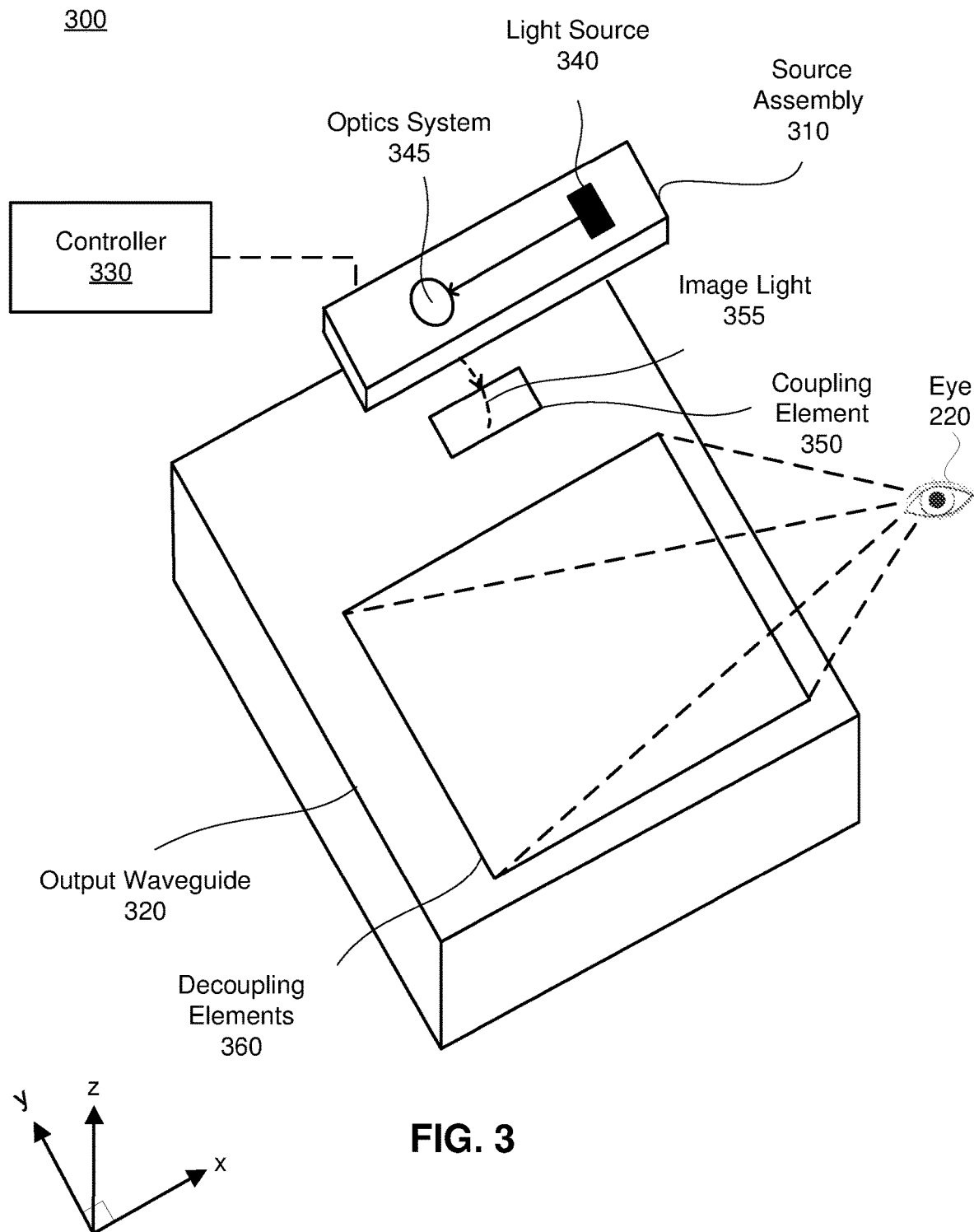
FIG. 3 is a perspective view of a display device, in accordance with some embodiments.

FIG. 3 illustrates a perspective view of a display device 300, in accordance with some embodiments. In some embodiments, the display device 300 is a component (e.g., the waveguide assembly 210 or part of the waveguide assembly 210) of the NED 100. In alternative embodiments, the display device 300 is part of some other NEDs, or another system that directs display image light to a particular location. Depending on embodiments and implementations, the display device 300 may also be referred to as a waveguide display and/or a scanning display. However, in other embodiment, the display device 300 does not include a waveguide or a scanning mirror. For example, the display device 300 can include a two-dimensional matrix of light emitters that directly project light on an image field such as a screen without a scanning mirror. In another embodiment, the image emitted by the two-dimensional matrix of light emitters may be magnified by an optical assembly (e.g., lens) before the light arrives a waveguide or a screen.

For a particular embodiment that uses a waveguide and an optical system, the display device 300 may include a source assembly 310, an output waveguide 320, and a controller 330. The display device 300 may provide images for both eyes or for a single eye. For purposes of illustration, FIG. 3 shows the display device 300 associated with a single eye 220. Another display device (not shown), separated (or partially separated) from the display device 300, provides image light to another eye of the user. In a partially separated system, one or more components may be shared between display devices for each eye.

The source assembly 310 generates image light 355. The source assembly 310 includes a light source 340 and an optics system 345. The light source 340 is an optical component that generates image light using a plurality of light emitters arranged in a matrix. The light source 340 generates an image light including, but not restricted to, a Red image light, a Blue image light, a Green image light, an infra-red image light, etc.

The optics system 345 performs a set of optical processes, including, but not restricted to, focusing, combining, conditioning, and/or scanning processes on the image light generated by the light source 340. In some embodiments, the optics system 345 includes a combining assembly, a light conditioning assembly, a waveguide assembly, and/or a scanning mirror assembly, as described below in detail in conjunction with FIG. 4. The source assembly 310 generates and outputs an image light 355 to a coupling element 350 of the output waveguide 320.

The output waveguide 320 is an optical waveguide that outputs image light to an eye 220 of a user. The output waveguide 320 receives the image light 355 at one or more coupling elements 350, and guides the received input image light to one or more decoupling elements 360. The coupling element 350 may be, e.g., a diffraction grating, a holographic grating, some other element that couples the image light 355 into the output waveguide 320, or some combination thereof. For example, in embodiments where the coupling element 350 is diffraction grating, the pitch of the diffraction grating is chosen such that total internal reflection occurs, and the image light 355 propagates internally toward the decoupling element 360. The pitch of the diffraction grating may be in the range of 300 nm to 600 nm.

The decoupling element 360 decouples the total internally reflected image light from the output waveguide 320. The decoupling element 360 may be, e.g., a diffraction grating, a holographic grating, some other element that decouples image light out of the output waveguide 320, or some combination thereof. For example, in embodiments where the decoupling element 360 is a diffraction grating, the pitch of the diffraction grating is chosen to cause incident image light to exit the output waveguide 320. An orientation and position of the image light exiting from the output waveguide 320 are controlled by changing an orientation and position of the image light 355 entering the coupling element 350. The pitch of the diffraction grating may be in the range of 300 nm to 600 nm.

The output waveguide 320 may be composed of one or more materials that facilitate total internal reflection of the image light 355. The output waveguide 320 may be composed of e.g., silicon, plastic, glass, or polymers, or some combination thereof. The output waveguide 320 has a relatively small form factor. For example, the output waveguide 320 may be approximately 50 mm wide along X-dimension, 30 mm long along Y-dimension and 0.5-1 mm thick along Z-dimension.

The controller 330 controls the imaging operations of the source assembly 310. The controller 330 determines imaging instructions for the source assembly 310 based at least on the one or more display instructions. Display instructions are instructions to render one or more images. In some embodiments, display instructions may simply be an image file (e.g., bitmap). The display instructions may be received from, e.g., a console of a VR system (not shown here). Imaging instructions are instructions used by the source assembly 310 to generate image light 355. The imaging instructions may include, e.g., a type of a source of image light (e.g., monochromatic, polychromatic), one or more illumination parameters, one or more scanning parameters (e.g., a scanning rate, an orientation of a scanning apparatus, etc.), or some combination thereof. The controller 330 includes a combination of hardware, software, and/or firmware not shown here so as not to obscure other aspects of the disclosure.

Figure 4:
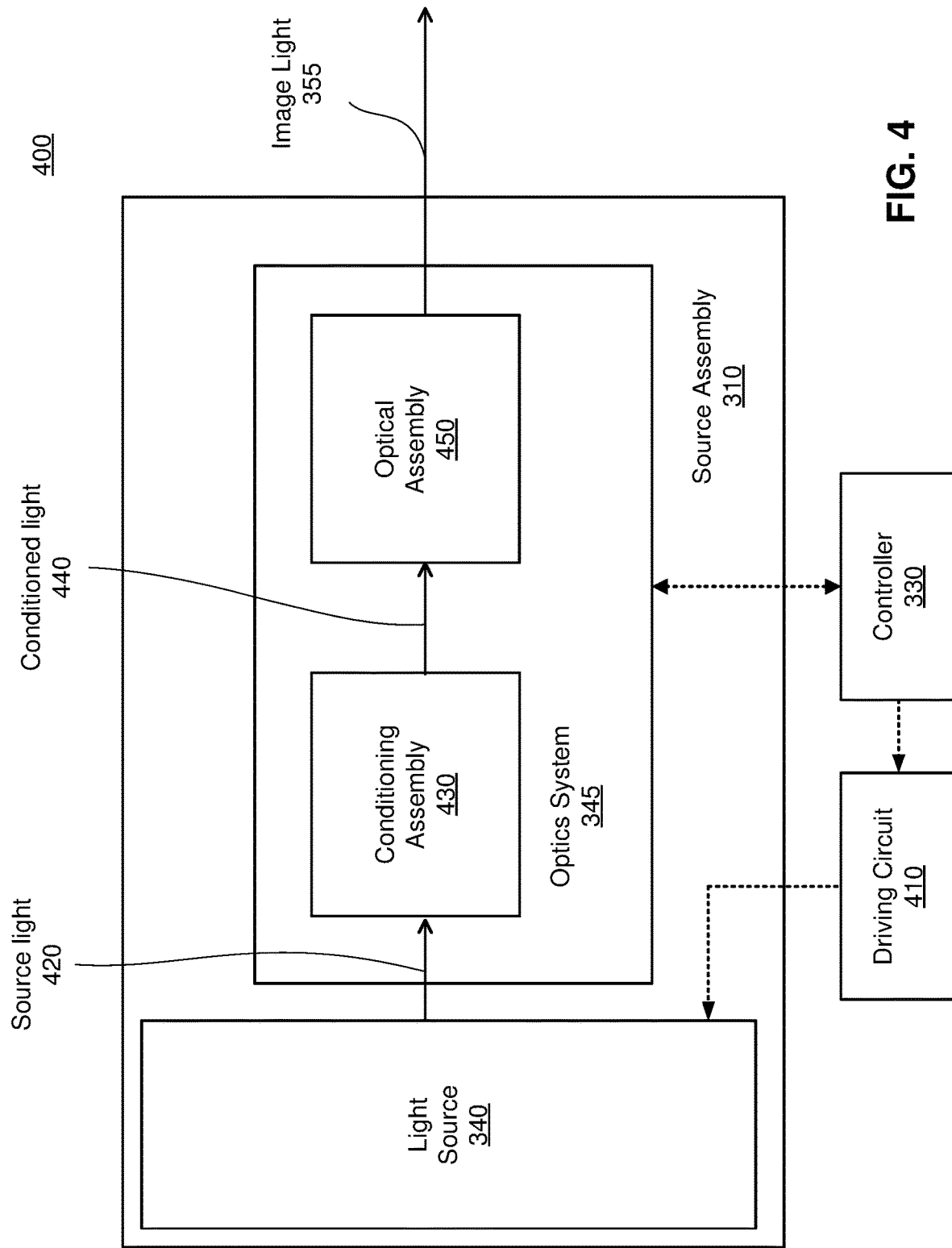
FIG. 4 is a block diagram of a source assembly, in accordance with some embodiments.

FIG. 4 illustrates a cross section 400 of the source assembly 310, in accordance with some embodiments. The controller 330 provides imaging instructions which may include clock signals and pixel data to a driving circuit 410. The driving circuit 410 modulates the pixel data and generate driving signals to drive the light source 340 to generate light in accordance with imaging instructions from a controller 330.

The light source 340 may generate a spatially coherent or a partially spatially coherent image light. The light source 340 may include multiple light emitters. The light emitters can be microLEDs (μLEDs), vertical cavity surface emitting laser (VCSEL) devices, light emitting diodes (LEDs), tunable lasers, and/or some other light-emitting devices. In one embodiment, the light source 340 includes a matrix of microLEDs. The light source 340 emits light in a visible band (e.g., from about 390 nm to 700 nm). The light source 340 emits light in accordance with one or more illumination parameters set by or received from the controller 330. An illumination parameter is an instruction used by the light source 340 to generate light. An illumination parameter may include, e.g., source wavelength, pulse rate, pulse amplitude, beam type (continuous or pulsed), other parameter(s) that affect the emitted light, or some combination thereof. The light source 340 emits source light 420. In some embodiments, the source light 420 includes multiple beams of Red light, Green light, and Blue light, or some combination thereof.

The optics system 345 includes one or more optical components that condition the light from the light source 340. Conditioning light from the light source 340 may include, e.g., expanding, collimating, adjusting orientation in accordance with instructions from the controller 330, some other adjustment of the light, or some combination thereof. The one or more optical components may include, e.g., lenses, mirrors, apertures, gratings, or some combination thereof. Light emitted from the optics system 345 is referred to as an image light 355. The optics system 345 outputs the image light 355 at a particular orientation (in accordance with the imaging instructions) toward the output waveguide 320 (shown in FIG. 3).

The optics system 345 may include a light conditioning assembly 430 and an optical assembly 450. The light conditioning assembly 430 conditions the source light 420 and emits conditioned light 440 to the optical assembly 450. The conditioned light 440 is light conditioned for incidence on the optical assembly 450. The light conditioning assembly 430 includes one or more optical components that condition the light from the light source 340. Conditioning light from the light source 340 may include, e.g., expanding, collimating, correcting for one or more optical errors (e.g., field curvature, chromatic aberration, etc.), some other adjustment of the light, or some combination thereof. The light conditioning assembly 430 conditions the source light 420 and emits the conditioned light 440 to the optical assembly 450.

The optical assembly 450 redirects image light via its one or more reflective and/or refractive portions. Where the image light is redirected toward is based on specific orientations of the one or more reflective and/or refractive portions. In some embodiments, the optical assembly 450 includes a waveguide that directs the conditioned light 440 to a display area viewed by the user, or to another waveguide such as the output waveguide 320 illustrated in FIG. 3. In some embodiments, the optical assembly 450 includes one or more scanning mirrors able to perform a raster scan (horizontally, or vertically), a biresonant scan, or some combination thereof. In some embodiments, the optical assembly 450 may perform a controlled vibration along the horizontal and/or vertical directions with a specific frequency of oscillation to scan along two dimensions and generate a two-dimensional projected line image of the media presented to user's eyes. In other embodiments, the optical assembly 450 may also include lens that serve similar or same function as one or more scanning mirror. In some embodiments, the optical assembly 450 includes a galvanometer mirror. For example, the galvanometer mirror may represent any electromechanical instrument that indicates that it has sensed an electric current by deflecting a beam of image light with one or more mirrors. The galvanometer mirror may scan in at least one orthogonal dimension to generate the image light 355. The image light 355 from the galvanometer mirror represents a two-dimensional line image of the media presented to the user's eyes.

The controller 330 controls the operations of light source 340 and the optical assembly 450. The operations performed by the controller 330 includes taking content for display, and dividing the content into discrete sections. The controller 330 instructs the light source 340 to sequentially present the discrete sections using individual source elements corresponding to a respective row in an image ultimately displayed to the user. In embodiments where the optical assembly 450 comprises a scanning mirror, the controller 330 instructs the optical assembly 450 to scan the presented discrete sections to different areas of a coupling element of the output waveguide 320 (shown in FIG. 3). Accordingly, at the exit pupil of the output waveguide 320, each discrete portion is presented in a different location. While each discrete section is presented at different times, the presentation and scanning of the discrete sections occur fast enough such that a user's eye integrates the different sections into a single image or series of images. The controller 330 may also provide imaging instructions to the light source 340 that include an address corresponding to an individual source element of the light source 340 and/or an electrical bias applied to the individual source element.

The image light 355 couples to the output waveguide 320 as described above with reference to FIG. 3.

Figure 5:
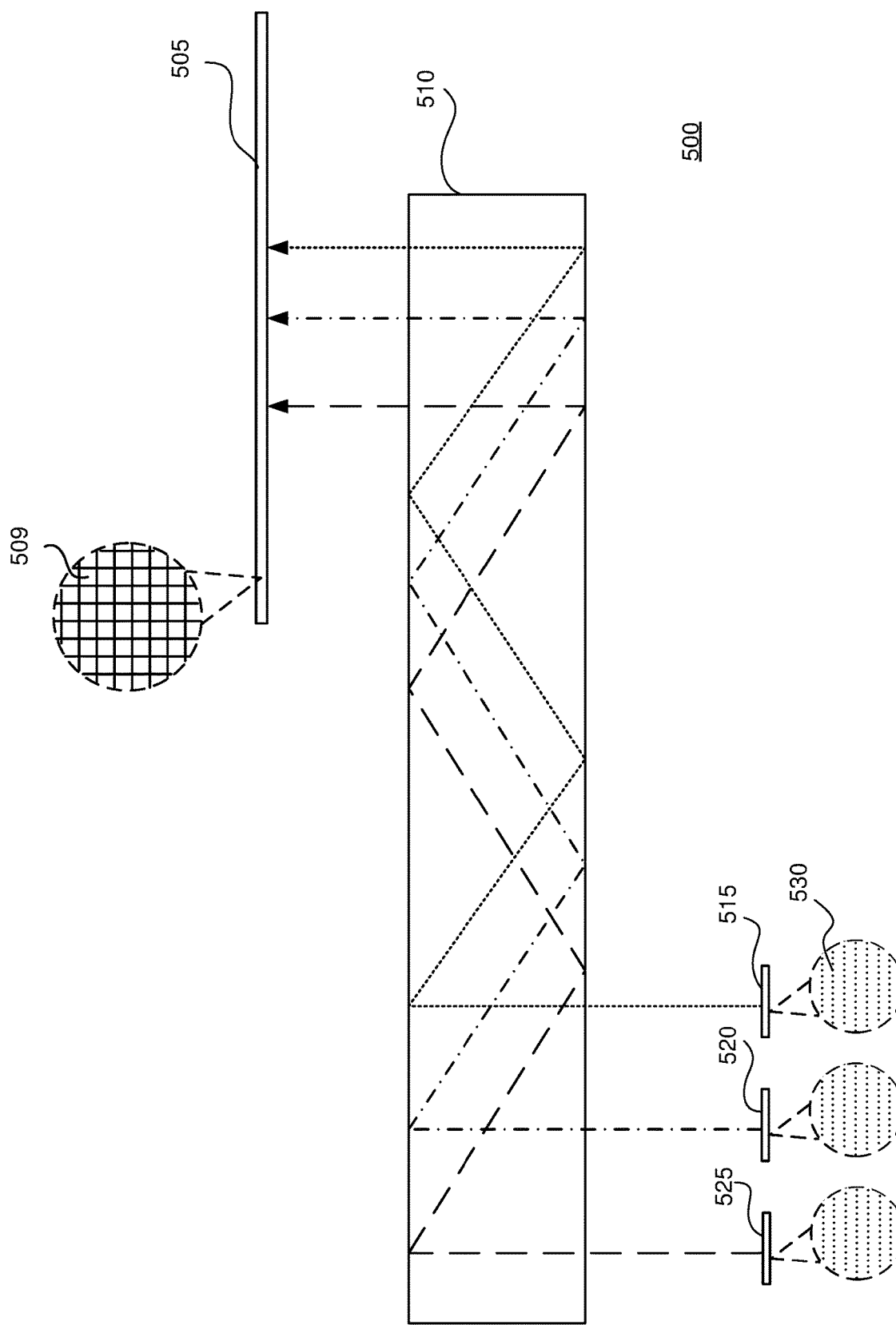
FIG. 5 is a diagram of a display device having a plurality of LED assemblies and a waveguide, in accordance with some embodiments.

FIG. 5 illustrates a display device 500 having a plurality of LED assemblies and a waveguide, in accordance with some embodiments. The display device 500 may correspond to the near-eye display 100 or another scan-type display device. The light source of the display device may comprise a plurality of LED assemblies 515, 520, and 525. Each LED assembly comprises an array of LEDs of a respective color channel. For example, the LED assemblies 515, 520, and 525 may correspond a red LED array, a green LED array, and a blue LED array, respectively. The LED assemblies may collectively correspond to the light source 340 shown in FIG. 4, or may be used in other display devices.

Each of the LED assemblies 515, 520, and 525 includes a 2-dimensional array of LEDs 530 configured to emit a set of collimated beams of light. In some embodiments, each of the LEDs 530 may correspond to a pixel or a sub-pixel of the display. Before reaching the waveguide 510, the light may be conditioned by different optical devices such as the conditioning assembly 430 (shown in FIG. 4 but not shown in FIG. 5). The waveguide 510 guides and projects the light from the LED assemblies to the viewing plane 505. In some embodiments, the waveguide 510 aligns and/or combines the light emitted from each of the LED assembly 515, 520, and 525, such that light emitted from corresponding LEDs 530 of each LED assembly are combined to form a pixel of the display. The waveguide 510 may further magnifies the emitted light, such that the light from the LED assemblies is fitted to the viewing plane 505.

The viewing plane 505 is an area that receives the light emitted from the LED assemblies. For example, the viewing plane 505 may correspond to a portion of the coupling element 350 or a portion of the decoupling element 360 in FIG. 3. In some cases, a viewing plane is not an actual physical structure but is an area to which the image light is projected and which the image is formed. The viewing plane 505 may be spatially defined by a matrix of pixel locations 509 in rows and columns. A pixel location 509 here refers to a single pixel. The pixel locations 509 (or simply the pixels) in the viewing plane 505 sometimes may not actually be additional physical structure. Instead, the pixel locations 509 may be spatial regions that divide the viewing plane 505. Also, the sizes and locations of the pixel locations may depend on the projection of the light from the LED assemblies. In some cases, a pixel location 509 may be subdivided spatially into subpixels (not shown). For example, a pixel location may include a Red subpixel, a Green subpixel, and a Blue subpixel. The Red subpixel corresponds to a location at which one or more Red light beams are projected, etc. When subpixels are present, the color of a pixel is based on the temporal and/or spatial average of the subpixels. In some embodiments, the number of rows and columns of LED array of each LED assembly may be the same as the number of rows and columns of the pixel locations 509 in the viewing plane 505.

The terms rows and columns may describe two relative spatial relationships of elements. While, for the purpose of simplicity, a column described herein is normally associated with a vertical line of elements, it should be understood that a column does not have to be arranged vertically (or longitudinally). Likewise, a row does not have to be arranged horizontally (or laterally). A row and a column may also sometimes describe an arrangement that is non-linear. Rows and columns also do not necessarily imply any parallel or perpendicular arrangement. Sometimes a row or a column may be referred to as a line.

The display device may operate in predefined display periods. A display period may correspond to a duration of time in which an image is formed. For example, a display period may be associated with the frame rate (e.g., a reciprocal of the frame rate).

While the embodiments of display devices in FIGS. 3-5 are shown to include a waveguide and an optical assembly, other embodiments of display devices may omit the waveguide and/or the optical assembly. For example, in some embodiments, the light emitters may be arranged in a two-dimensional matrix that project light directly onto an image field without going through an optical assembly. In one of those embodiments, the light emitters may project simultaneously onto the entire image field without scanning. An optical assembly that magnifies the dimensional of the image may or may not be used, depending on the implement. Likewise, in one embodiment, a screen may be used in place of a waveguide. In embodiments, a display period may be referred to a frame. The rate of changing of the display period may be referred to the frame rate.

Figure 6:
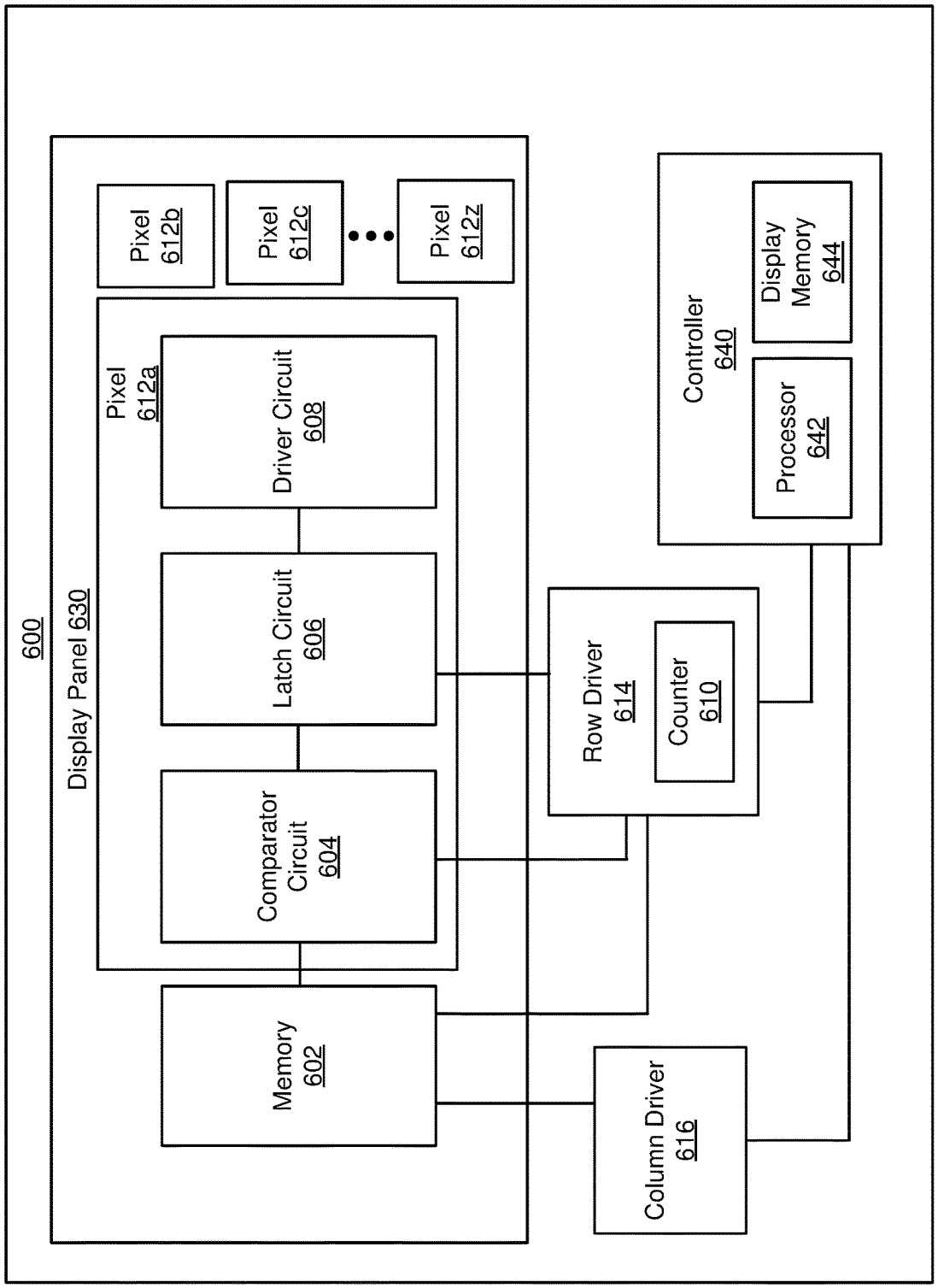
FIG. 6 is a block diagram of a display device, in accordance with some embodiments.

FIG. 6 is a block diagram of a display device 600, in accordance with some embodiments. The display device 600 includes a display panel 630 including multiple pixels 612*a* through 612*z* (collectively referred to as "pixels 612" or individually as "pixel 612"). FIG. 6 illustrates a detailed structure for controlling a pixel 612*a*, but other pixels 612*b* through 612*z* may have the same control structure as pixel 612*a*. The components of the pixel 612 provide for digital PWM generation with digital comparison in pixel. The pixel 612 includes a light emitting diode (LED) which outputs light at an intensity level that is controlled using PWM. The pixel 612 includes a comparator circuit 604, a latch circuit 606, and driver circuit 608. A memory 602 is connected to each pixel 612, in particular to the comparator circuit 604. The comparator circuit 604 is connected to the latch circuit 606, and the latch circuit 606 is connected to the driver circuit 608.

The display device 600 further includes a row driver 614 including a counter 610 and a column driver 616. The row driver 614 and column driver 616 are connected to each of the pixels 612. Specifically, the row driver 614 is connected to the memory 602, the comparator circuit 604, and the latch circuit 606. The column driver 616 is connected to the memory 602. The display device 600 further includes a controller 640 including a processor 642 and a display memory 644. The controller 640 is connected to the row driver 614 and the column driver 616.

The memory 602 may include a digital data storage, such as a static random-access memory (SRAM) or some other types of memory. The memory 602 is connected to the row driver 614 via word lines and connected to the column driver 616 via a bit line and an inverse bit line. The memory 602 receives from the row driver 614 signals for word lines (WL) for memory cell selection, and receives from the column driver 616 control words in the form of data bits D for writing to the selected memory cells. The bit values of the data bits defining the intensity level of the pixel for a PWM frame. The number of data bits in a control word may vary. In one example, each control word in the memory 602 stores 3-bit values to provide eight gradations of brightness (e.g., 000, 001, 010, 011, 100, 101, 110, 111). In another example, each control word in the memory 602 stores 8-bit values to provide for sixteen gradations of brightness. Additional details regarding the memory 602 are discussed in connection with FIG. 9.

The row driver 614 may include a counter 610 for each pixel row or groups of pixel rows. The counter 610 is at least partially embodied using a circuit to generate bit values of count bits. The number of count bits corresponds with the number of data bits in the control word. In the example of 3-bit values, the counter 610 generates a sequence of for each subframe of a PWM frame including bit values 000, 001, 010, 011, 100, 101, and 111. Here, the counter 610 counts from 0 to 7 in binary to generate the sequence. In some embodiments, the counter 610 inverts each count bit to facilitate comparison by the comparator circuit 604.

The comparator circuit 604 receives the count bits from the row driver 614 generated by the counter 610 and receives the data bits of the control word from the memory 602, and compares the count bits with the data bits to generate a comparison result. The comparison result is generated based on a NOR of each data bit AND corresponding count bit as defined by Equation 1:

$$(!count[0] \& D[0]) | (!count[1] \& D[1]) | \ldots | (!count[n] \& D[n]) \quad \text{Eq. (1)}$$

where !count[x] is the xth inverse count bit, D[x] is the xth data bit of the control word, and n+1 is the length of the control word and count bits. The comparison defined by Equation 1 is an ordered comparison of corresponding data bits and count bits, which allows for a simplified comparator circuit 604. The comparator circuit 604 includes a dynamic comparison node that switches between a high and low level according to the comparison result, and outputs the comparison result to the latch circuit 606. Additional details regarding the comparator circuit 604 are discussed in connection with FIG. 10.

The latch circuit 606 receives the comparison result from the comparator circuit 604, and generates a gate signal for a driving transistor of the driver circuit 608. The latch circuit 606 retains the desired state of the gate signal sent to the driver circuit 608 even while there may be switching of the comparison result at the dynamic comparison node of the comparator circuit 604. Additional details regarding the comparator circuit 604 and latch circuit 606 are discussed below in connection with FIG. 10.

The driver circuit 608 includes the driving transistor having a terminal (e.g., source or drain) connected the LED. The driving transistor further includes a gate terminal connected to the latch circuit 606 to receive the gate signal for control of current flow through the source and drain terminals of the driving transistor and the LED. Additional details regarding the driver circuit 608 are discussed below in connection with FIG. 11.

In some embodiments, the control circuitry of the pixels, including the comparator circuit 604, latch circuit 606, and driver circuit 608, is arranged in a thin-film-transistor (TFT) layer of the display device 600.

The row driver 614 and column driver 616 control the operation of the pixels 612. For example, the row driver 614 may control signals (e.g., nPchng, FBEn, LatchCmp, word line bits, count bits) that operate the comparator circuit 604 and latch circuit 606 to drive the pixels 612 at intensity levels defined by the data bits of control words. The row driver 614 may provide different signals to different pixel rows to drive the pixel rows using different time intervals for subframes of PWM frames. Different pixel rows may emit light with uniform brightness based on the timing intervals for subframes being different for different pixel rows. In some embodiments, the time interval for subframes may be scaled up (e.g., from a standard time interval applied to unadjusted pixel rows) to increase light emission brightness for a pixel row, or scaled down from the standard time interval to decrease light emission brightness for the pixel row. The column driver 616 provides the data bits of the control words to the memory 602, which are programmed into memory cells of the memory 602 based on selection by the word lines from the row driver 614.

The controller 640 includes the processor 642 and the display memory 644. The processor 642 provides control signals to the row driver 614 and the column driver 616 to operate the pixels 612. The display memory 644 (also referred to herein as a "data storage device") stores PWM timing data for different pixel rows of the display panel 630. The PWM timing data defines the PWM time interval of subframes for PWM frames. The PWM time interval for different pixel rows may be different to improve brightness uniformity for across the pixel rows of the display panel 630. For example, the display memory 644 may store a table including a PWM time interval for each of the pixel rows. In some embodiments, the controller 640 may be separate from the display device 600.

Figure 7:
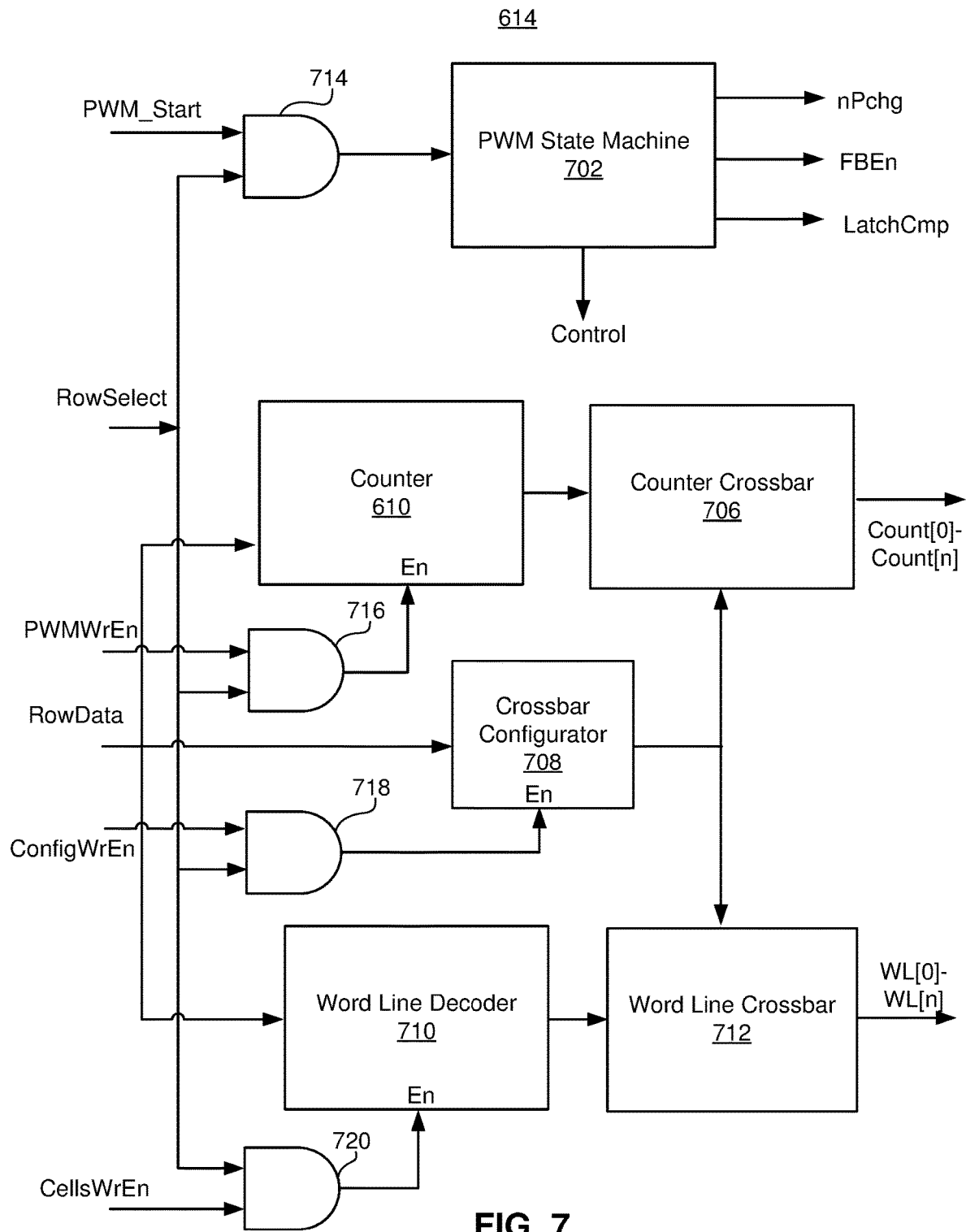
FIG. 7 is a circuit diagram illustrating a row driver, in accordance with some embodiments.

FIG. 7 is a circuit diagram illustrating a row driver 614, in accordance with some embodiments. The row driver 614 includes, for one or more pixel rows of the display device 600, a PWM state machine 702, the counter 610, a counter crossbar 706, a crossbar configurator 708, a word line decoder 710, word line crossbar 712, and AND gates 714, 716, 718, and 720. The components of the row driver 614 may be used to control one or more pixel rows of the display device 600. In one example, groups of 16 pixel rows are grouped together to share the same components of the row driver 614 and PWM timing. In another example, the top half of pixel rows shares a first set of components and have a first PWM timing, and the bottom half of pixel rows shares a second set of components and have a second PWM timing. As such, the row driver 614 may include multiple instances of the components shown in FIG. 7 to handle the pixel rows of the display device 600.

The row driver 614 is connected to controller 640 to receive control signals that control the operation of the row driver 614 include a PWM_Start signal, a RowSelect signal, a PWMWrEn signal, a RowData signal, a ConfigWrEn signal, and a CellsWrEn signal. The RowData signal may include PWM timing data that defines the PWM time interval of subframes for PWM frames. The time interval for the subframes of a PWM frame may be the same, or may vary with respect to each other. The RowData signal may further bit order data defining how the word line bits and count bit pairs are to be rearranged by the row driver 614.

The PWM state machine 702 generates a node precharge signal (nPchg), a feedback enable signal (FBEn), and a latch compare signal (LatchCmp) for controlling the operation of the comparator circuits 604 and latch circuits 606 of the pixels 612 of the pixel row, as discussed in greater detail below in connection with FIGS. 9 through 15. The PWM state machine 702 may be connected to each of the counter 610, counter crossbar 706, crossbar configurator 708, word line decoder 710 and word line crossbar 712 to control the operation of these other components of the row driver 614. For example, the PWM state machine 702 may include a timer or clock to coordinate the timing of the various signals provided to the pixels 612.

The PWM state machine 702 may coordinate the timing of the signals provided to the pixels based on PWM timing data defining the time interval for subframes of PWM frames (also referred to herein as the "PWM time interval"). Varying the PWM timing interval of subframes for different pixel rows can be used to ensure brightness uniformity across the pixel rows of the display device 600. For example, scaling up the PWM time interval of a pixel row to a longer time interval (e.g., from a standard time interval) can be used to increase the brightness of light emission from the pixel row and scaling down the PWM time interval for a pixel row to a shorter time interval can be used to decrease the brightness of light emission from the pixel row.

The PWM state machine 702 may further facilitate the rearrangement of data bit and count bit pairs, such as to allow failing data locations (e.g., in the memory 602) to be pushed to lower significance, thus limiting the visual impact. This can be achieved by changing the order of word line bits for selecting memory cells of the memory 602, and thus changing the order of data bits stored in the memory 602 used in comparisons with the count bits.

The PWM state machine 702 is further connected to the AND gate 714, and the AND gate 714 is receives the PWM_Start signal and the RowSelect signal. PWM_Start is a timing signal that indicates the start of PWM operation for the row. The RowSelect signal is high when the row is selected and low when the row is not selected. When both PWM_Start and RowSelect are high, the PWM state machine 702 begins the PWM operation for the row.

The counter 610 generates the count bits Count[0] through Count[n]. The counter receives the RowData signal defining the properties of the counter, such as the number of bits of the counter and the PWM timing data. The counter 610 may be a non-uniform PWM counter capable of changing the timing of counter increments based on the PWM time interval.

The counter 610 is further connected to the AND gate 716, and the AND gate 716 is connected to the PWMWrEn signal and the RowSelect signal. PWMWrEn is a signal used to program the counter 610. When both PWMWrEn and RowSelect are high, the counter 610 is enabled for programming.

The counter crossbar 706 may rearrange the count bits from the counter 610 based on instructions from the crossbar configurator 708. The counter crossbar 706 is connected to the counter 610 to receive the count bits, and is further connected to the comparator circuit 604. The counter crossbar 706 provides the count bits Count[0] through Count[n], or rearranged count bits Count[0] through Count[n], to the comparator circuit 604.

The word line decoder 710 receives RowData defining the memory cell selection, and converts the received data into word line signals WL[0] through WL[n]. The word line decoder 710 is connected to the AND gate 720, which is connected to the RowSelect signal and the CellsWrEn signal. The CellsWrEn signal is used to enable writing data to the word line decoder 710. When both CellsWrEn and RowSelect are high, the word line decoder 710 is enabled to receive and store the data from the RowData signal.

The word line crossbar 712 may rearrange the word line bits from the word line decoder 710 based on instructions from the crossbar configurator 708. The word line crossbar 712 is connected to the word line decoder 710 to receive the word line bits. The word line crossbar 712 is further connected to the memory 602 to provide the word line signals WL[0] through WL[n] to the memory 602.

The crossbar configurator 708 is connected to the counter crossbar 706 and word line crossbar 712, and controls their operation to provide for the rearrangement of word line bit and count bit pairs. The crossbar configurator 704 receives RowData including bit order data indicating how the word line bits and count bit pairs are to be rearranged. The crossbar configurator 704 is further connected to the AND gate 718, which is connected to the RowSelect signal and the ConfigWrEn signal. The ConfigWrEn signal is used to enable writing crossbar configurations to the crossbar configurator 704. When both ConfigWrEn and RowSelect are high, the crossbar configurator 704 is enabled to be programmed based on RowData.

Figure 8A:
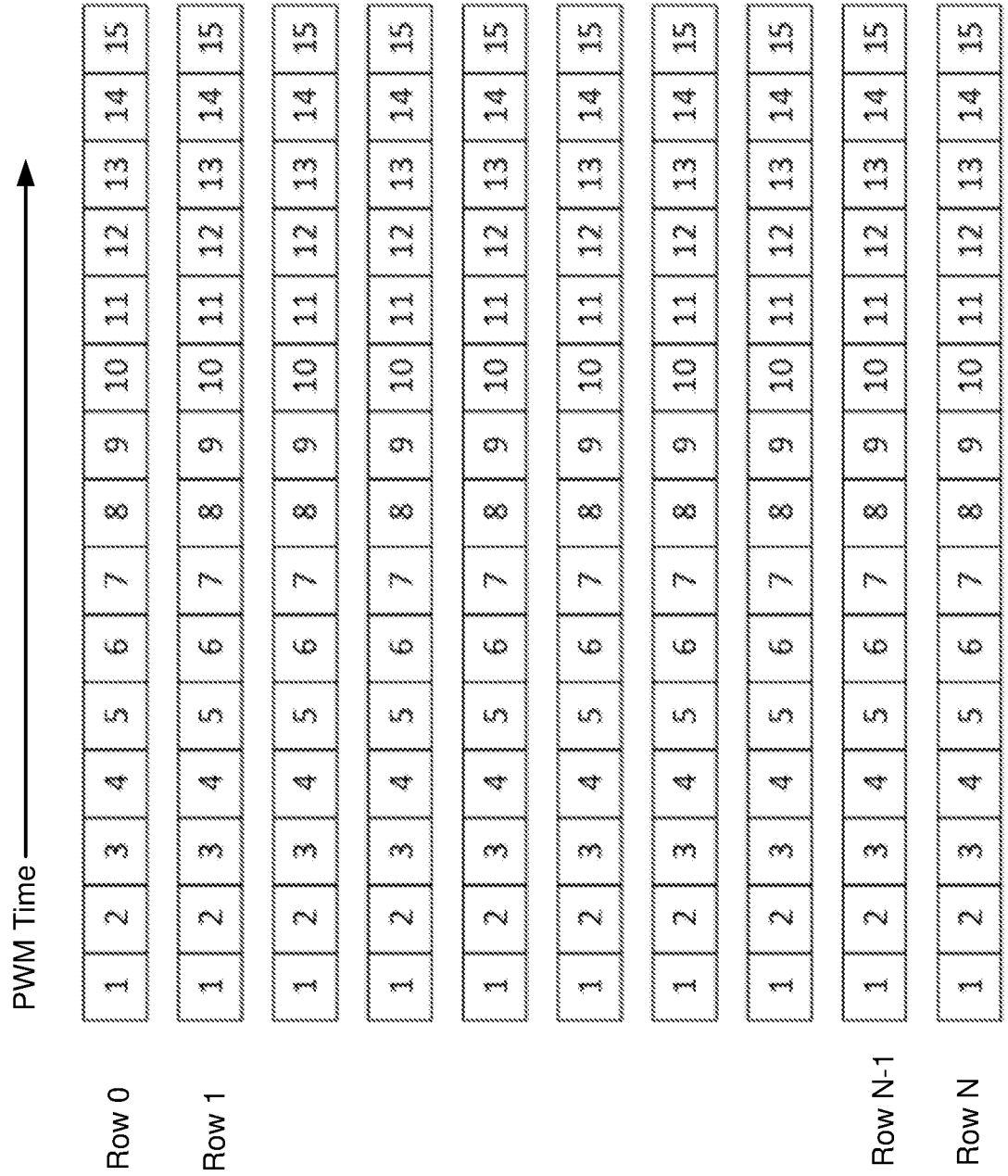
FIG. 8A is a diagram illustrating uniform PWM timing across pixel rows of the display device, in accordance with some embodiments.

FIG. 8A is a diagram illustrating uniform PWM timing across pixel rows of the display device, in accordance with some embodiments. In this example, the display device includes pixel row 0 through pixel row N. For each pixel in each row, the timing of the PWM switching events, as may be controlled by the timing of the incrementing of count bits, is uniform. In this example, there are fifteen subframes with the same PWM time interval for each PWM frame. Each PWM frame corresponds with a brightness value represented by a control word. If the pixel rows the display device have uniform brightness, then there is no need for brightness compensation. However, because of potential manufacturing defects of LEDs, defects in connecting LEDs to control circuitry, or any other causes for non-uniform brightness in the pixel rows, the PWM timing intervals in different pixel rows may be varied to improve the brightness uniformity of the display device.

Figure 8B:
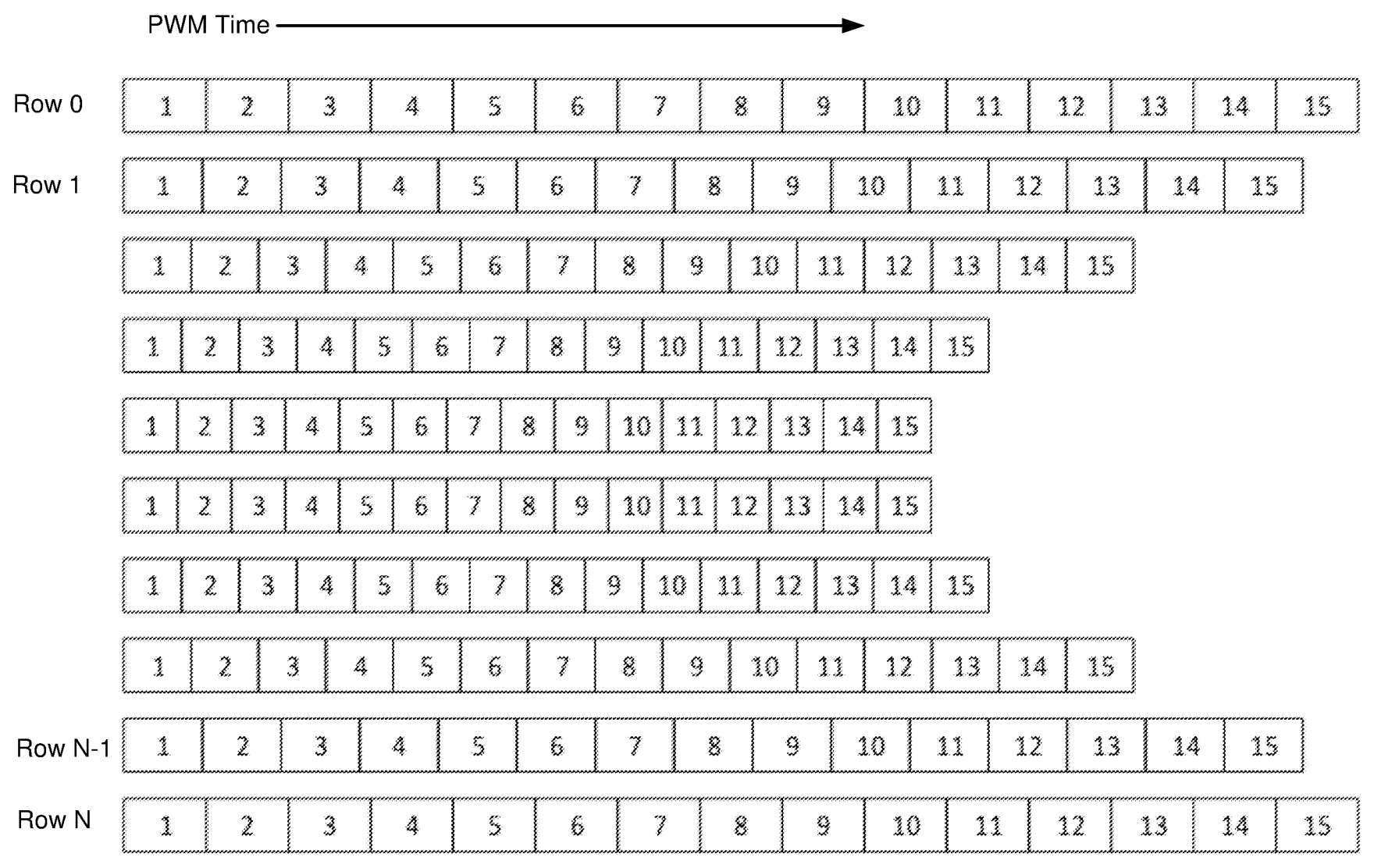

FIG. 8B is a diagram illustrating variable PWM timing across pixel rows of the display device for brightness control, in accordance with some embodiments. In this example, there are also fifteen subframes for each PWM frame. However, different pixel rows have different PWM time intervals. In this example, there is a gradient of different brightness levels of the LEDs going from lower brightness at the top pixel rows to higher brightness at the middle pixel rows and then back to lower brightness at the bottom pixel row. The configuration of pixel row PWM timing shown in FIG. 8B can be used to compensate for this gradient in pixel row brightness. In particular, the top and bottom pixels rows (e.g., row 0, 1, row N−1, row N) have longer PWM time intervals than the middle pixel rows. More generally, different pixel rows (or groups of pixel rows) may use a suitable PWM time interval as needed to improve brightness uniformity across the pixels rows of the display panel.

In some embodiments, the display device may include different color pixels, such as red, green, and blue pixels. Each of the different color pixels may be on a separate array. The brightness profile across different pixel rows may be different for different colors, and thus the row PWM timing for pixel rows may be different for different colors.

The calibration for row brightness adjustment can be performed at various times. In one example, the calibration may be performed during a manufacturing step. An optical system may be used to measure the relative brightness of the pixel rows, or a circuit measuring system may be used to measure the driving current for LEDs of the pixel rows. Each set of colors may have its own set of measured non-uniformity values. Based on the non-uniformity values measured for each pixel row, PWM timing data may be generated to improve brightness uniformity for across the pixel rows. The PWM timing data may then be used to vary the PWM time intervals for different pixel rows. In another example, the calibration may be performed some other time, such as through the lifetime of display device as LED performance degrades.

Figure 9:
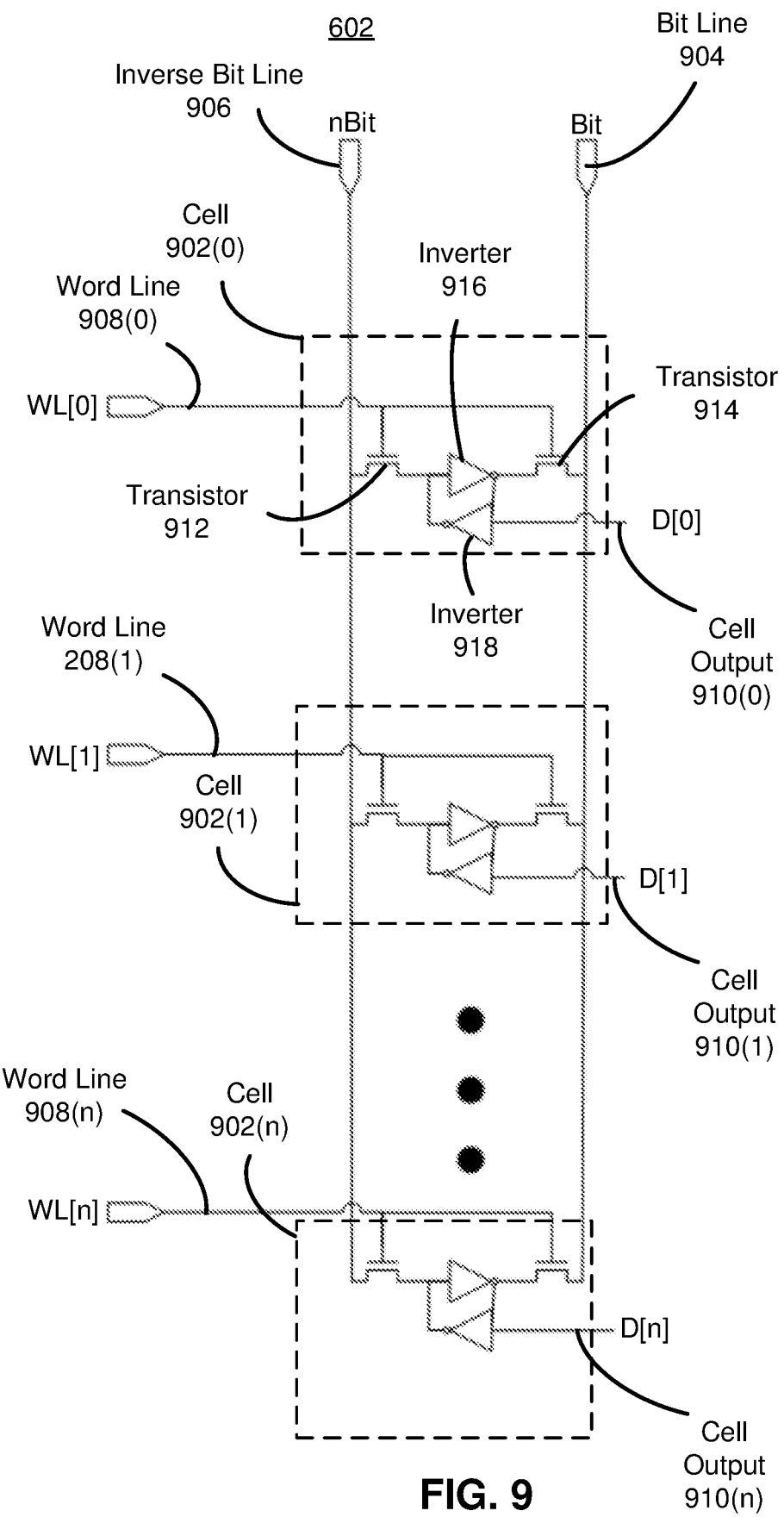
FIG. 9 is a circuit diagram illustrating a memory for a pixel, in accordance with some embodiments.

FIG. 9 is a circuit diagram illustrating a memory 602 of a pixel 612, in accordance with some embodiments. In particular, a portion of the memory 602 for a single pixel 612 is shown. The memory 602 stores the bits of the control word and outputs the control word to the comparator circuit 604. The memory 602 includes cells 902(0) through 902($n$), where n+1 is the bit length of the control word. Each cell 902(0) through 902($n$) is connected to the row driver 614 via a respective word line 908(0) through 908($n$), and further connected to the column driver 616 via a bit line 904 and inverse bit line 906. Each cell 902(0) through 902($n$) further includes a respective cell output 910(0) through 910($n$) to output a bit value stored in the cell to the comparator circuit 604.

With reference to the cell 902(0), each cell may include a transistor 912, a transistor 914, and cross coupled inverters 916 and 918. The transistors 912 and 914 are NMOS transistors. The transistor 912 includes a first terminal connected to the inverse bit line 906 and a second terminal connected to a first node of formed by the cross coupled inverters 916 and 918. The transistor 914 includes a first terminal connected to the bit line 904, and another terminal connected to a second node formed by the cross coupled inverters 916 and 918. The gate terminals of the transistors 912 and 914 are each connected to the word line 908(0). The second node formed by the cross coupled inverters 916 and 918 is connected to the cell output 910(0).

To program the cell 902(0) with a bit value, the word line 908(0) of the cell 902(0) is set to a high signal, the bit line 904 is set to the bit value, and the inverse bit line 906 is set to an inverse of the bit value. This results in the bit value on the bit line 904 being stored in the cell 902(0), and being output at the cell output 910(0). The other cells of the memory 602 may include similar components and operation as discussed herein for the cell 902(0). The memory 602 receives signals WL[0] through WL[n] via the respective word lines 908(0) through 908(n), signal Bit from the bit line 904, and signal nBit from the inverse bit line 906 to store control words, and outputs the bit values of the control words via cell outputs 910(0) through 910(n). For each PWM frame, the memory 602 stores a control word and outputs the control word via the cell outputs 610(0) through 610(n) as data signals D[0] through D[n].

Figure 10:
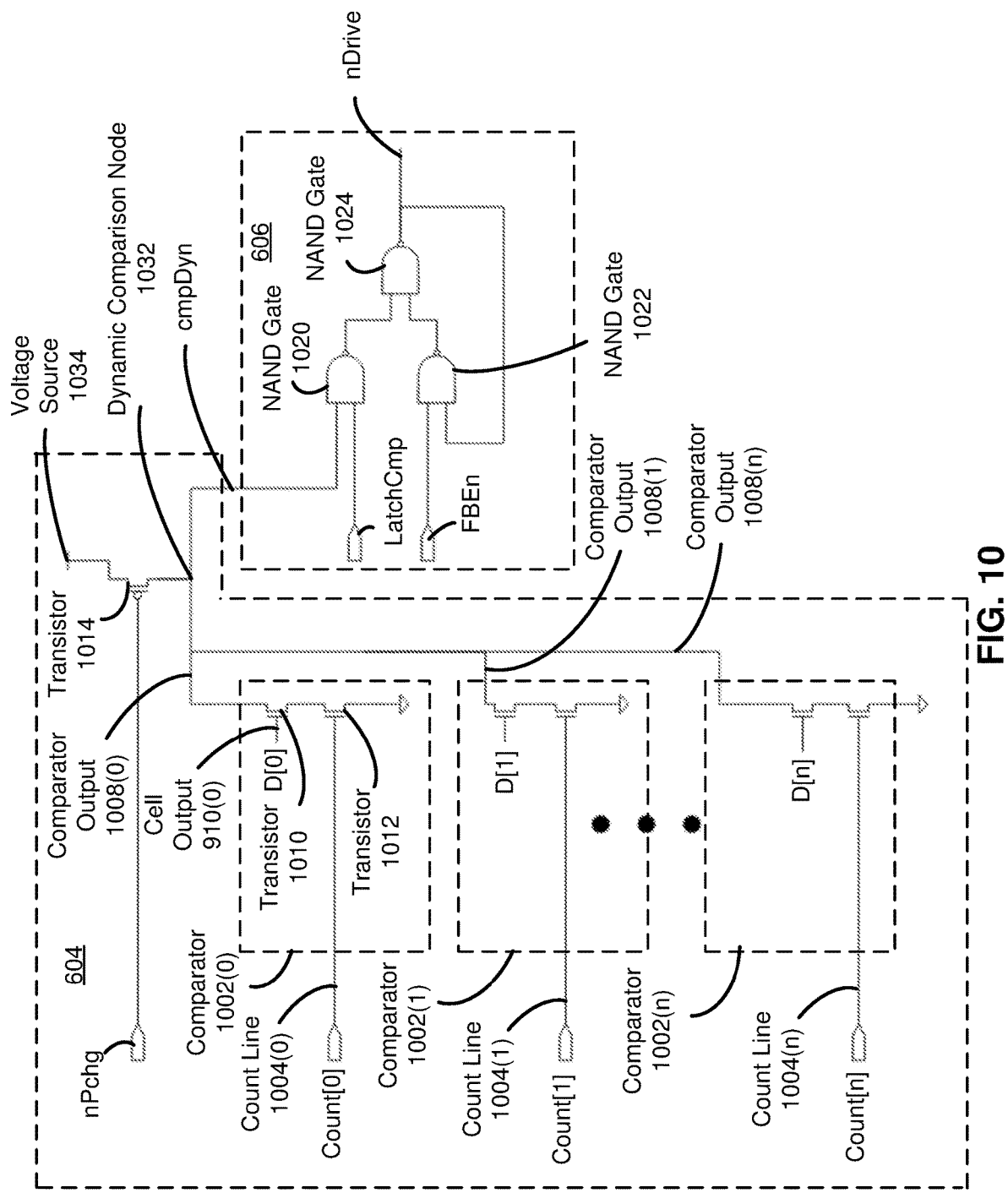
FIG. 10 is a circuit diagram illustrating a comparator circuit and a latch circuit of the pixel, in accordance with some embodiments.

FIG. 10 is a circuit diagram illustrating a comparator circuit 604 and a latch circuit 606 of the pixel 612, in accordance with some embodiments. The comparator circuit 604 includes comparators 1002(0), 1002(1), . . . through 1002(n), where n+1 is the bit length of the control word and the bit length of the counter. Each comparator 1002(0) through 1002(n) is connected to a respective count line 1004(0) through 1004(n) to receive a count bit value (i.e., inverse count bits) from the row driver 614 (via one of the signals Count[0] through Count[n]), and the memory 602 to receive a data bit value of the control word (via one of the signals D[0] through D[n]). Each comparator 1002(0) through 1002(n) compares a data bit value of the control word with a count bit value of the counter. Each comparator 1002(0) through 1002(n) further includes a respective comparator output 1008(0) through 1008(n), which are connected at a dynamic comparison node 1032 to the transistor 1014. The dynamic comparison node 1032 switches between low and high levels according to Equation 1, and thus provides the comparison result output of the comparator circuit 604.

With reference to the comparator 1002(0), each comparator may include a transistor 1010 and a transistor 1012. The transistors 1010 and 1012 are NMOS transistors. A first terminal of the transistor 1012 is connected to a reference voltage (e.g., ground), and a second terminal of the transistor 1012 is connected to a first terminal of the transistor 1010. A second terminal of the transistor 1010 is connected to the comparator output 1008(0). A gate terminal of the transistor 1012 is connected to the count line 1004(0) to receive a bit value of the counter. A gate terminal of the transistor 1010 is connected to the cell output 910(0) to receive a bit value of the control word (D[0]). The other comparators of the comparator circuit 604 may include similar components and operation as discussed herein for the comparator 1002(0).

The comparator circuit 604 further includes a transistor 1014. The transistor 1014 is an NMOS transistor. A gate terminal of the transistor 1014 receives the signal node precharge (nPchg) from the row driver 614. A first terminal of the transistor 1014 is connected to a voltage source 1034 and a second terminal of the transistor 1014 is connected to each of the cell outputs 910(0) through 910(n) at the dynamic comparison node 1032. The second terminal of the transistor 1014 is further connected to the output of the comparator circuit 604 at the dynamic comparison node 1032. The output of the comparator circuit 604 is the comparison result at the dynamic comparison node 1032 called cmpDyn signal.

The nPchg signal controls switching for the value of the cmpDyn signal at the dynamic comparison node 1032. At the beginning of a comparison cycle for each subframe of the PWM frame, the nPchg signal is at a first voltage level (e.g., 0 voltage) (also referred to as "low level" herein) from the prior comparison cycle, allowing the dynamic comparison node 1032 to be set at a second voltage level (e.g., 5 voltage) (also referred to as "high level" herein) higher than the first voltage level via the voltage source 1034 and transistor 1014. After the dynamic comparison node 1032 is set to the high level, the nPchg signal is set to a high level such that the transistor 1014 disconnects the dynamic comparison node 1032 from the voltage source 1034, resulting in the high level of the cmpDyn signal at the dynamic comparison node 1034. During the comparison for the comparison cycle, the floating voltage of the dynamic comparison node 1032 may discharge to ground if D[x] matches Count[x] at one of the comparators 1002(1) through 1002(n), or remain at the high level if D[x] fails to match Count[x] at each of the comparators 1002(1) through 1002(n). At the end of the comparison cycle for the subframe, the nPchg signal is set to a low level for the next comparison cycle.

The latch circuit 606 includes, among other components, NAND gates 1020, 1022, and 1024. A first input of the NAND gate 1020 is connected to dynamic comparison node 1034 of the comparator circuit 604 to receive the cmpDyn signal. A second input of the NAND gate 1020 is connected to the latch compare signal (LatchCmp). The LatchCmp signal is another control signal from the row driver 614. The LatchCmp signal may be set to a high level to store the cmpDyn signal at the dynamic comparison node 1034 within the latch circuit 606, and otherwise set to a low level. There is a window of time in each subframe after the cmpDyn signal has settled when the comparison result at the dynamic comparison node 1034 is valid, and the LatchCmp signal is used to store the value of the cmpDyn signal in the latch circuit 606 only when it is valid. An output of the NAND gate 1020 is connected to an input of the NAND gate 1024. A first input of the NAND gate 1022 is connected to the signal feedback enable (FBEn). An output of the NAND gate 1024 is the nDrive signal, which is connected to the driver circuit 608. The FBEn signal is another control signal from the row driver 614. The FBEn signal controls the feedback of the nDrive signal. The FBEn signal may be set to a low level for the first subframe of the PWM frame to allow the cmpDyn signal to control the nDrive signal. If the cmpDyn signal is a low level based on the comparison defined Equation 1 for the first subframe, then the nDrive signal also goes to a low level and turns on the LED. The FBEn signal otherwise remains at a high level for the remaining subframes. For each PWM frame, once the cmpDyn signal goes to a high level based on the comparison defined Equation 1 and the FBEn signal remains high, then the nDrive signal remains held at the high level for the remaining subframes of the PWM frame, thus resulting in the LED being off for the remaining subframes (i.e., regardless of the comparison results of remaining subframes that may result in switching of the cmpDyn signal). In that sense, the bit values of the control word control the LED being turned on for a variable number of subframes of the PWM frame to control the intensity level of light emission from the LED during the PWM frame.

Figure 11:
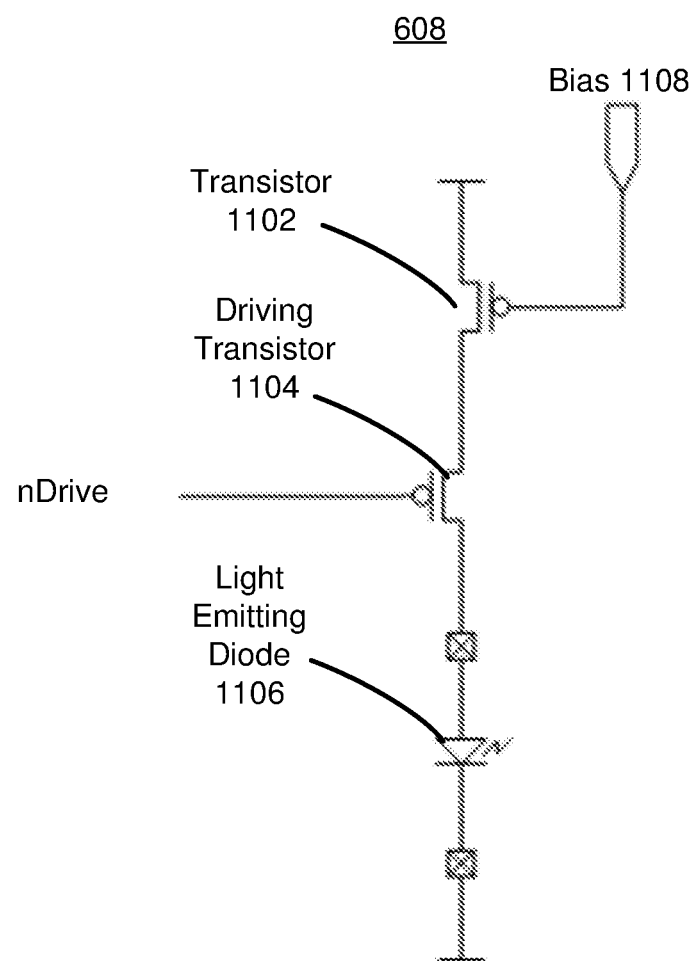
FIG. 11 is a circuit diagram illustrating a driver circuit of the pixel, in accordance with some embodiments.

FIG. 11 is a circuit diagram illustrating a driver circuit 608 of the pixel 612, in accordance with some embodiments. The driver circuit 608 includes a transistor 1102 and a driving transistor 1104. The transistor 1102 and driving transistor 1104 are PMOS transistors. A first terminal of the driving transistor 1104 is connected to a terminal of the transistor 1102, and a second terminal of the driving transistor 1104 is connected to a light emitting diode 1106. A gate of the transistor 1102 is connected to a supply signal bias 1108 (e.g., a voltage source). A gate of the driving transistor 1104 receives the nDrive signal from the latch circuit 606. In some embodiments, the LED 1106 is a micro-LED.

Figure 12:
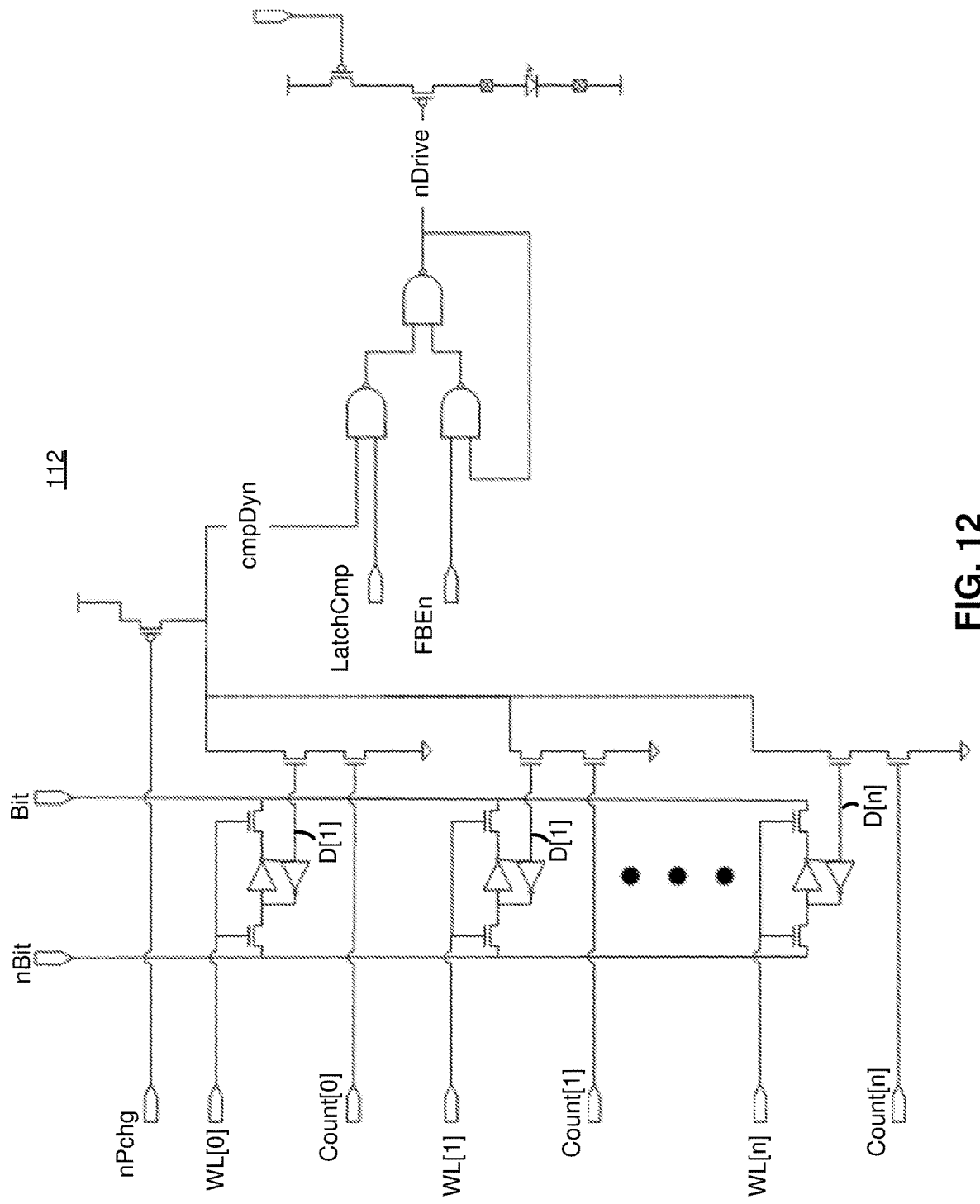
FIG. 12 is a circuit diagram illustrating signals of the pixel, in accordance with some embodiments.

FIG. 12 is a circuit diagram illustrating signals of the pixel 612, in accordance with some embodiments. The memory 602, comparator circuit 604, latch circuit 606, and driver circuit 608 as shown in FIGS. 9, 10, and 11 are shown as connected. The data bits D[0] through D[n], count lines Count[0] through Count[n], word lines WL[0] through WL[n], nBit, Bit, cmpDyn signal, LatchCMP signal, FBEn signal, and nDrive signal are also shown.

Figure 13:
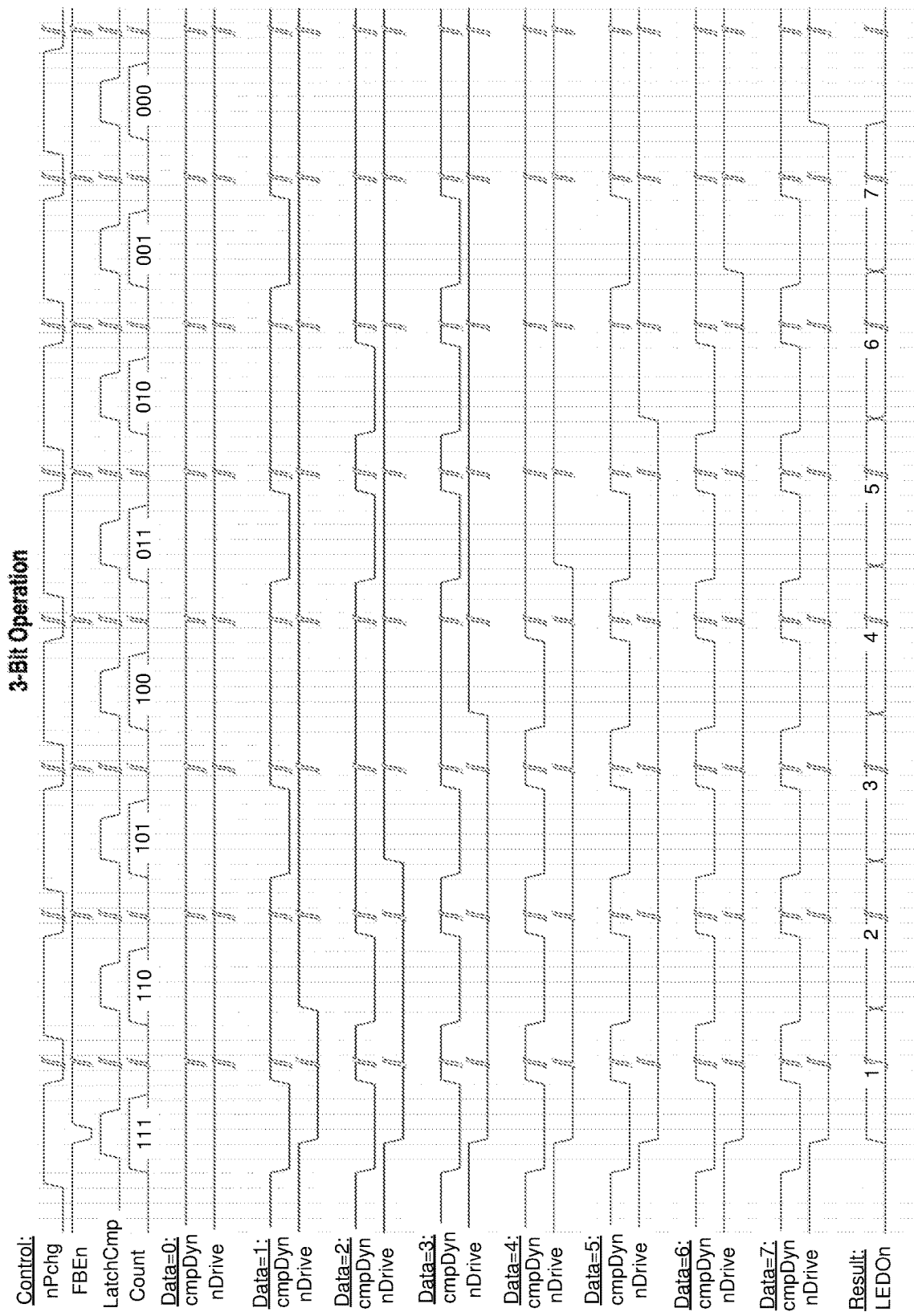
FIG. 13 is a timing diagram for the signals of the pixel for 3-bit control words, in accordance with some embodiments.

FIG. 13 is a timing diagram for the signals of the pixel 612 for 3-bit control words, in accordance with some embodiments. For the 3-bit operation, both the control word ("Data") and the counter ("Count") are defined by 3 bits. Each PWM frame includes ($2^3$) eight subframes, each subframe corresponding with a different count value. The count begins in the first subframe with 111, and decrements for each subframe until the count is 000 for the final subframe. There are also eight possible data values for the control word between 0 and 7 defined by the 3 bits used during the PWM frame. The nPchg signal is set to a high level for each subframe to and set to a low level between subframes. The FBEn signal is set to low level for the first subframe, and otherwise set to a high level. The LatchCmp signal is set to a high level in each subframe when the comparison result of cmpDyn is in a valid state, and otherwise set to a low level. When the nDrive signal is low the LED is on. When the nDrive signal is high, the LED is off. The signal levels for the nDrive signal show that the LED is turned on (e.g., other than for data=0) and held on a variable number of subframes depending on the data value of the control word.

Figure 14:
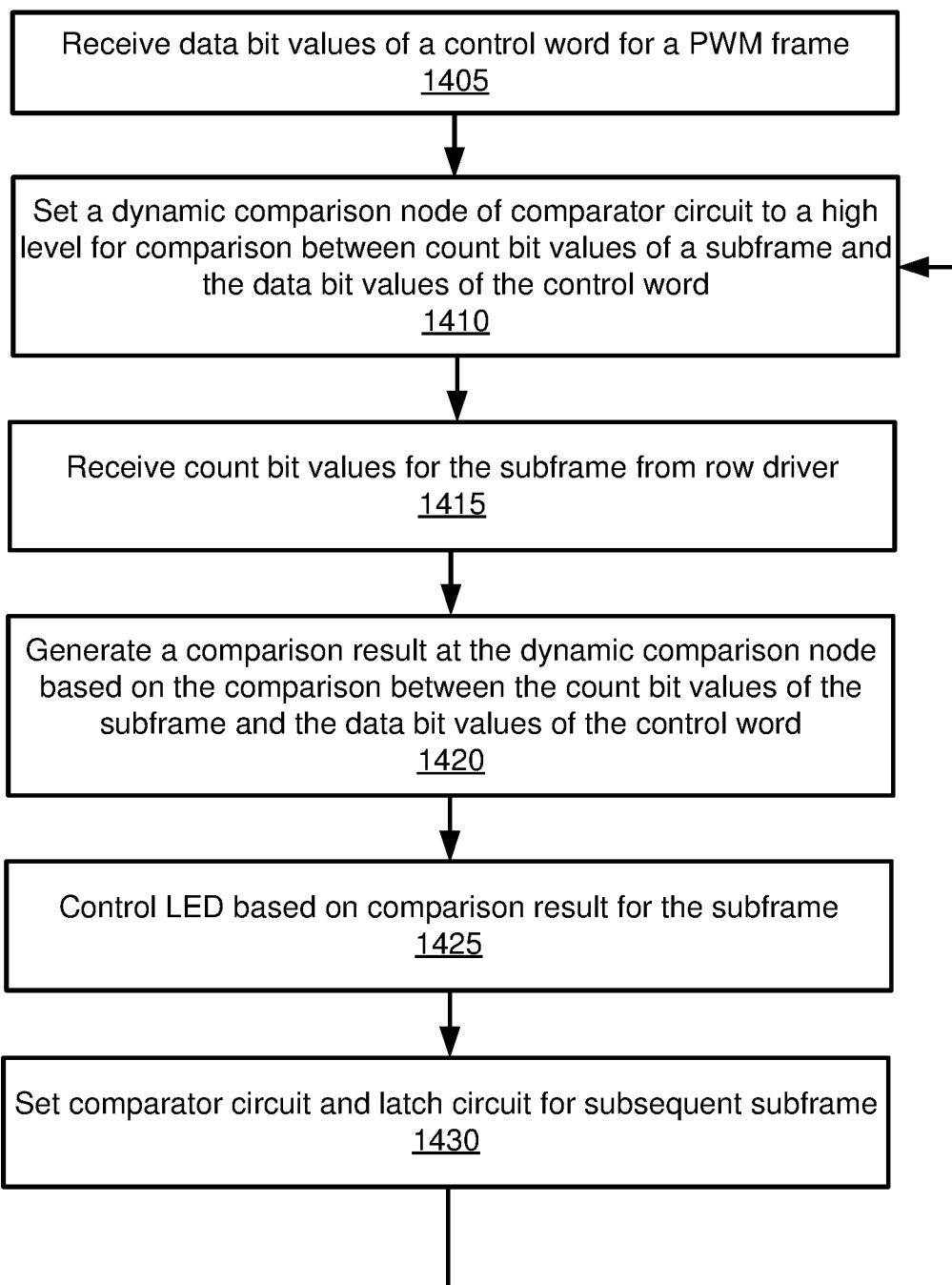
FIG. 14 is a flowchart illustrating a process for controlling a pixel of the display device, in accordance with some embodiments

FIG. 14 is a flowchart illustrating a process 1400 for controlling a pixel 612 of the display device 600, in accordance with some embodiments. The process 1400 may have fewer or additional steps, and steps may be performed in different orders or in parallel.

The comparator circuit 604 receives 1405 data bit values of a control word for a PWM frame from the memory 602. For example, the memory 602 receives each of the data bit values D[0] through D[n] via the signals Bit and nBit from the column driver 616 as selected by the word lines WL[0] through WL[n] from the row driver 614. The memory 602 stores the data bit values and provides the data bit values to the comparator circuit 604 for the PWM frame. The bit values D[0] through D[n] of the control word of the PWM frame define the desired intensity level of the LED 1106 for the PWM frame. In the example of a 3-bit control word, the data bit value 000 corresponds with the lowest intensity level, and the data bit value 111 corresponds with the highest intensity level.

The row driver 614 sets 1410 a dynamic comparison node 1032 of the comparator circuit 604 to a high level for a comparison between count bit values of a subframe and the data bit values of the control word. To set the dynamic comparison node 1032, the nPchg signal is set at low level from a previous comparison cycle at the start of the subframe, resulting in the dynamic comparison node 1032 and cmpDyn signal being set to a high level by the voltage source 1034. The count bits of the counter Count[0] through Count[n] are set at a low level from the previous comparison cycle. The LatchCmp signal is set at a low level from the previous comparison cycle. The FBEn signal is set at a high level from the previous comparison cycle.

For the first subframe, the nDrive signal is set to a high level from the previous PWM frame such that the LED 1106 is off. After the start of the subframe, the nPchg signal is set to the high level, resulting in the dynamic comparison node 1032 and the cmpDyn signal being disconnected from the voltage source 1034, and having a floating high voltage level.

The comparator circuit 604 receives 1415 count bit values for the subframe of the PWM frame from the row driver 614. In the example of the 3-bit control word and counter as shown in FIG. 13, the comparator circuit 604 receives the count bit values 111 for the first subframe, 110 for the second subframe, 101 for the third subframe, 100 for the fourth subframe, 011 for the fifth subframe, 010 for the sixth subframe, 001 for the seventh subframe, and 000 for the eighth subframe.

The comparator circuit 604 generates 1420 a comparison result at the dynamic comparison node 1032 based on a comparison of the bit values of the control word and the bit values of the counter. The dynamic comparison node 1032 discharges to a low level if any count bit and corresponding data bit are both at a high level, and otherwise remains at the high level. The dynamic comparison node 1032, and the cmpDyn signal at the node 1032, remaining high indicates a match when the LED 1106 should switch on. The comparison result is generated based on a NOR of each data bit D[x] AND corresponding inverse count bit Count[x] as defined by Equation 1.

FIG. 15 shows a table 1500 of comparison results at the dynamic comparison node 1032 of the pixel 612, in accordance with some embodiments. For the count value and the control word each being 3 bits, there are eight possible data values ("intensity level") and count values ("Count"). The table 1500 shows the comparison result at the dynamic comparison node 1032 for each possible data value and count value. Each count value and data value is shown in binary and decimal. The inverse count values used in Equation 1 for the bitwise comparisons with the data bit values are also shown.

In some embodiments, the comparator circuit 604 uses rearranged data bit and count bit pairs to allow failing data locations (e.g., in the memory 602) to be pushed to lower significance, thus limiting the visual impact. The row driver 614 may be configured to rearrange word line bits and count bits as discussed above in connection with FIG. 7. The rearranged word line bits result in different data bits of the control word being stored in different memory cells of the memory 602, thus resulting in rearranged data bit and count bit pairs for the ordered comparison. The ordered comparison function defined by Equation 1 requires only that data significance matches the count significance at each comparator. With reference to FIGS. 9 and 10, for example, if the cell 902(n) that handles the most significant bit is damaged, then the most significant data bit D[n] and most significant count bit Count [n] may be handled by another cell and comparator, such as the cell 902(1) and comparator 1002(1) that otherwise handles the least significant bit. As such, the visual impact on intensity level is decreased.

The latch circuit 606 controls 1425 the LED 1106 based on the comparison result at the dynamic comparison node 1032. For example, the row driver 614 sets the LatchCmp signal of the latch circuit 606 to a high level after asserting the count bits. As shown in FIG. 13, the LatchCmp signal may be set to a high level once during each subframe to allow the cmpDyn signal at the dynamic comparison node 1034 to be stored within the latch circuit 606, and the cmpDyn signal may otherwise remain at the low level. Also as shown in FIG. 13, the row driver 614 sets the FBEn signal of the latch circuit 606 to a low level for the first subframe of the PWM frame (corresponding with count bit values 111 for 3-bit operation), and otherwise keeps the FBEn signal at a high level for the other subframes of the PWM frame. When the FBEn signal is at the low level and the LatchCmp signal is at the high level, the latch circuit 106 provides the value of the cmpDyn signal at the dynamic comparison node 1032 to the nDrive signal. Once the cmpDyn signal goes to a high level based on the comparison defined Equation 1 and the FBEn signal remains high, such as in a subsequent subframe of the PWM frame, then the nDrive signal remains held at the high level for the remaining subframes of the PWM frame, thus resulting in the LED 1106 being off for the remaining subframes regardless of the comparison results of the remaining subframes that may result in switching of the cmpDyn signal. As such, the nDrive signal is low and the LED 1106 is on for a number of subframes of the PWM frame as defined by the data bit values.

The row driver 614 sets 1430 the comparator circuit 604 and the latch circuit 606 for a subsequent subframe. For example, the control signals may be set to their original values at the start of the subframe in reverse order to complete the comparison cycle for the subframe and prepare for the next subframe. The row driver 614 sets the FBEn signal of the latch circuit 606 to a high level. For remaining subframes of the PWM frame after the first subframe, the FBEn signal remains at the high level, thus resulting in the LED 1106 being off for the remaining subframes regardless of the comparison results of remaining subframes that may result in switching of the cmpDyn signal. Furthermore, the row driver 614 sets the LatchCMP signal to a low level, sets the count bits to a low level (e.g., 000), and sets the nPchg signal to a low level.

The process 1400 may return to 1410 for the next subframe of the PWM frame. In the next subframe, the count bit values are updated (e.g., decremented), and compared with the data bit values of the control word for the PWM frame. Alternatively, if the end of the PWM frame has been reached, the process 1400 may return to 1405 to receive data bit values for a control word of a subsequent PWM frame.

FIG. 16 is a flowchart illustrating a process for row based brightness uniformity compensation in a display device, in accordance with some embodiments. The process 1600 may have fewer or additional steps, and steps may be performed in different orders or in parallel.

A row driver 614 of a display device provides 1605 first signals to a first pixel row of the display device 600 to drive the first pixel row using a first time interval for a subframe of a PWM frame of the first pixel row. The PWM frame may include multiple subframes. Each subframe may have a duration defined by the first time interval. In another example, different subframes of the first pixel row may include different time intervals. The row driver 614 may control multiple pixel rows using the first time interval.

The row driver 614 provides 1610 second signals to a second pixel row of the display device 600 to drive the second pixel row using a second time interval for a subframe of a PWM frame of the second pixel row. Each subframe of the second pixel row may have a duration defined by the first time interval, or different subframes may include different time intervals.

The first time interval used for the subframe(s) of the first pixel row may be different from the second time interval used for the subframe(s) of the first pixel row. Longer time intervals can be used to increase brightness of light emission and shorter time intervals can be used to decrease the brightness of light emission. The first pixel row and the second pixel row may emit light with uniform brightness based on the first time interval being different from the second time interval.

The signals for the pixel rows from the row driver 614 may include the nPchg signal, the FBEn signal, the LatchCmp signal, the signals providing word lines, and the signals providing count bits. The display device may also include a column driver 616 to provide signals for data bits. The timing of these signals as shown in FIG. 13 may be altered (e.g., lengthened or shortened) to adjust the brightness of the pixel rows.

In some embodiments, the display device or some other device connected to the display device may include a data storage device. The data storage devices stores PWM timing data defining the first time interval for the first pixel row and the second time interval for the second pixel row, and provides the PWM timing data to the row driver.

In some embodiments, the time intervals for subframes of a pixel row may be scaled up from a standard time interval for subframes (e.g., used for other pixel rows without brightness adjustment) to increase light emission brightness, or may be scaled down from the standard time interval to decrease light emission brightness.

In some embodiments, the row driver 614 includes a timer for each pixel row or group of pixel rows with different time intervals for subframes. For example, the row driver may include a first timer to control timing control timing of the first signals to drive the first pixel row and a second timer to control timing of the second signals to drive the second pixel row.

Although two pixel rows (or groups of pixel rows) are discussed in connection with the process 1600, various numbers of pixel rows may be similarly controlled via signals from the row driver 614. The PWM frame timing for different pixel rows may be different as appropriate to improve the uniformity of light emission across the pixel rows of the display device 600.

Additional Configuration Information

The foregoing description of the embodiments has been presented for the purpose of illustration; it is not intended to be exhaustive or to limit the patent rights to the precise forms disclosed. For example, the number of bits used for the control word and counter may vary. In another example, the NMOS transistors may be PMOS, or vice versa, with the polarity of the control signals being correspondingly reversed between high and low voltage levels. In another example, the gate arrangements of circuits may be modified using with logical equivalents. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A display device, comprising:
a row driver including a counter configured to generate count bit values for subframes of a pulse width modulation (PWM) frame; and
a display panel connected to the row driver, the display panel including pixels, a pixel including:
a comparator circuit including a dynamic comparison node, the comparator circuit configured to generate comparison results at the dynamic comparison node by comparing the count bit values of the subframes and data bit values of a control word defining a brightness level of the pixel for the PWM frame, wherein comparator circuit includes a plurality of comparators each configured to compare a data bit value of the data bit values and a count bit value of the count bit values, the plurality of comparators configured to:
set the dynamic comparison node to a first level when the data bit value and the count bit value compared by at least one of the plurality of comparators are both at a second level different from the first level; and
set the dynamic comparison node to the second level when at least one of the data bit value or the count bit value compared by each of the plurality of comparators are at the first level; and
a light emitting diode (LED) configured to turn on or off responsive to the comparison results at the dynamic comparison node.

2. The display device of claim 1, wherein the pixel further includes:
a driver circuit connected to the LED to control current in the LED; and
a latch circuit connected to the dynamic comparison node and the driver circuit, the latch circuit configured to:
isolate the dynamic comparison node of the comparator circuit from the driver circuit during each of the comparisons; and
provide signals for turning on or off the LED to the driver circuit responsive to the comparison results at the dynamic comparison node.

3. The display device of claim 2, wherein:
the signals turn the LED on responsive to a first comparison result for a first subframe of the PWM frame including a third level and turn the LED off responsive to a second comparison result for a second subframe of the PWM frame subsequent to the first subframe including a fourth level different from the third level; and
the signals keep the LED off for remaining subframes of the PWM frame after being turned off in the second subframe.

4. The display device of claim 2, further comprising a memory connected to the comparator circuit, the memory configured to store the data bit values and provide the data bit values to the comparator circuit.

5. The display device of claim 4, wherein each comparator includes:
a first transistor including a first terminal connected to a reference voltage, a second terminal connected to a second transistor, and first gate terminal connected to the row driver to receive the count bit value; and
the second transistor including a third terminal connected to the second terminal of the first transistor, a fourth terminal connected to the dynamic comparison node, and a second gate terminal connected to the memory to receive the data bit value.

6. The display device of claim 5, wherein
the comparator circuit includes a third transistor including a fifth terminal connected to the dynamic comparison node, a sixth terminal connected to a voltage source, and a third gate terminal connected to the row driver; and
the row driver is configured to provide a node precharge signal to the third gate terminal, the node precharge signal causing the dynamic comparison node to include a floating voltage for each of the comparisons between the count bit values of the subframes and the data bit values of the control word for the PWM frame.

7. The display device of claim 6, wherein the node precharge signal includes the second level during each of the subframes of the PWM frame and the first level between the subframes of the PWM frame.

8. The display device of claim 7, wherein the latch circuit includes:
a first NAND gate including a first input connected to the dynamic comparison node, a second input connected to the row driver, and a first output;
a second NAND gate including a third input connected to the row driver, a fourth input, and a second output; and
a third NAND gate including a fifth input connected to the first output of the first NAND gate, a sixth input connected to the second output of the second NAND gate, and a third output connected to the fourth input of the second NAND gate and the driver circuit.

9. The display device of claim 8, wherein:
the row driver is configured to provide a latch compare signal to the second input of the first NAND gate to store a comparison result at the dynamic comparison node within the latch circuit; and
the row driver is configured to provide a feedback enable signal to the third input of the second NAND gate to provide the comparison result to the driver circuit via the third output of the third NAND gate.

10. The display of claim 9, wherein:
the latch compare signal includes a third level during each subframe of the PWM frame and includes a fourth level different from the third level between the subframes of the PWM frame; and
the feedback enable signal includes a fifth level during the first subframe of the PWM frame when the latch compare signal includes the third level and includes a sixth level different from the fifth level during other subframes of the PWM frame.

11. The display of claim 9, wherein the driver circuit includes:
a fourth transistor including a seventh terminal connected to a driving transistor and a fourth gate terminal connected to a supply signal; and
the driving transistor including an eighth terminal connected to the seventh terminal of the fourth transistor, a ninth terminal connected to the LED, and a fifth gate terminal connected to the third output of the third NAND gate of the latch circuit.

12. The display of claim 4, wherein the row driver further includes:
a counter crossbar configured to rearrange the count bit values generated by the counter and provide the rearranged count bit values to the comparator circuit for the generating the comparison results;
a word line decoder configured to generate word line bit values for programming the memory with the data bit values; and
a word line crossbar configured to rearrange the word line bit values generated by the word line decoder and provide the rearranged word line bit values to the memory for programming the memory with the data bit values;
wherein the comparator circuit configured to generate the comparison results at the dynamic comparison node includes the comparator circuit being configured to compare the rearranged count bit values with rearranged data bit values, the rearranged data bit values being stored in the memory according to the rearranged word line bit values.

13. A method, comprising:
generating, by a counter of a row driver of a display device, count bit values for subframes of a pulse width modulation (PWM) frame;
generating, by a comparator circuit of a pixel of a display panel of the display device, comparison results at a dynamic comparison node of the comparator circuit by comparing the count bit values of the subframes and data bit values of a control word defining a brightness level of the pixel for the PWM frame, wherein generating the comparison results includes;
setting, by a plurality of comparators of the comparator circuit that each compare a data bit value of the data bit values and a count bit value of the count bit values, the dynamic comparison node to a first level when the data bit value and the count bit value compared by at least one of the plurality of comparators are both at a second level different from the first level; and
setting, by the plurality of comparators, the dynamic comparison node to the second level when at least one of the data bit value or the count bit value compared by each of the plurality of comparators are at the first level; and
turning on or off a light emitting diode (LED) of the pixel responsive to the comparison results at the dynamic comparison node.

14. The method of claim 13, further comprising, by the row driver, causing the dynamic comparison node to include a floating voltage for each of the comparisons between the count bit values of the subframes and the data bit values of the control word for the PWM frame.

15. The method of claim 13, further comprising:
controlling, by a driver circuit of the pixel connected to the LED, current in the LED; and
isolating, by a latch circuit connected to the dynamic comparison node and the driver circuit, the dynamic comparison node of the comparator circuit from the driver circuit during each of the comparisons; and
providing, by the latch circuit, signals for turning on or off the LED to the driver circuit responsive to the comparison results at the dynamic comparison node.

16. The method of claim 15, wherein:
the signals turn the LED on responsive to a first comparison result for a first subframe of the PWM frame including a third level and turn the LED off responsive to a second comparison result for a second subframe of the PWM frame subsequent to the first subframe including a fourth level different from the third level; and
the signals keep the LED off for remaining subframes of the PWM frame after being turned off in the second subframe.

17. The method of claim 15, further comprising, by a memory connected to the comparator circuit, storing the data bit values and providing the data bit values to the comparator circuit.

18. The method of claim 17, further comprising generating, by a word line decoder of the row driver, word line bit values for programming the memory with the data bit values.

19. The method of claim 18, further comprising:
rearranging, by a counter crossbar of the row driver, the count bit values generated by the counter;
providing, by the counter crossbar, the rearranged count bit values to the comparator circuit for the generating the comparison results;
rearranging, by a word line crossbar of the row driver, the word line bit values generated by the word line decoder; and
providing, by the word line crossbar, the rearranged word line bit values to the memory for programming the memory with the data bit values;
wherein generating the comparison results at the dynamic comparison node includes comparing the rearranged count bit values with rearranged data bit values, the rearranged data bit values being stored in the memory according to the rearranged word line bit values.

* * * * *

UNITED STATES PATENT AND TRADEMARK OFFICE
CERTIFICATE OF CORRECTION

| | | |
|---|---|---|
| PATENT NO. | : 11,138,920 B2 | Page 1 of 1 |
| APPLICATION NO. | : 16/779168 | |
| DATED | : October 5, 2021 | |
| INVENTOR(S) | : Michael Yee | |

It is certified that error appears in the above-identified patent and that said Letters Patent is hereby corrected as shown below:

In the Claims

Column 20, Claim 10, Line 44, replace "display of claim" with -- display device of claim --

Column 20, Claim 11, Line 54, replace "display of claim" with -- display device of claim --

Column 20, Claim 12, Line 64, replace "display of claim" with -- display device of claim --

Column 22, Claim 15, Line 3, replace "LED; and" with -- LED; --

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*